US010871071B1

(12) United States Patent
     Strain

(10) Patent No.: US 10,871,071 B1
(45) Date of Patent: Dec. 22, 2020

(54) ROTARY ENGINE

(71) Applicant: David Joseph Strain, Saint Peters, MO (US)

(72) Inventor: David Joseph Strain, Saint Peters, MO (US)

(*) Notice: Subject to any disclaimer, the term of this patent is extended or adjusted under 35 U.S.C. 154(b) by 90 days.

(21) Appl. No.: 15/652,637

(22) Filed: Jul. 18, 2017

(51) Int. Cl.
| | |
|---|---|
| *F01C 1/22* | (2006.01) |
| *F02B 53/12* | (2006.01) |
| *F02B 53/10* | (2006.01) |
| *F02B 55/10* | (2006.01) |
| *F02B 55/02* | (2006.01) |
| *F02B 55/16* | (2006.01) |
| *F01C 21/18* | (2006.01) |
| *F01C 21/08* | (2006.01) |

(52) U.S. Cl.
    CPC ............ *F01C 1/22* (2013.01); *F01C 21/08* (2013.01); *F01C 21/18* (2013.01); *F02B 53/10* (2013.01); *F02B 53/12* (2013.01); *F02B 55/02* (2013.01); *F02B 55/16* (2013.01)

(58) Field of Classification Search
    CPC .......... F02B 53/10; F02B 53/12; F02B 55/02; F02B 55/16; F01C 1/22; F01C 21/08; F01C 21/18
    USPC ....... 123/205, 206, 244, 248, 225, 213, 215; 418/248, 249, 123
    See application file for complete search history.

(56) References Cited

U.S. PATENT DOCUMENTS

| | | | | |
|---|---|---|---|---|
| 1,225,056 | A * | 5/1917 | Riggs et al. ............ | F02B 53/00 123/241 |
| 1,307,282 | A * | 6/1919 | Ward ...................... | F02B 53/00 123/228 |
| 1,309,096 | A * | 7/1919 | Leibing .................. | F02B 53/00 123/228 |
| 1,551,688 | A * | 9/1925 | Perry ..................... | F01C 1/46 418/251 |
| 2,175,265 | A * | 10/1939 | Johnson ................ | F02B 53/00 123/228 |
| 2,250,484 | A * | 7/1941 | Jutting .................. | F02B 53/00 123/248 |
| 2,762,346 | A * | 9/1956 | White .................... | F02B 53/00 123/225 |
| 2,827,024 | A * | 3/1958 | Arietti ................... | F02B 53/00 123/228 |
| 2,938,505 | A * | 5/1960 | Quartier ................ | F02B 53/00 123/222 |

(Continued)

FOREIGN PATENT DOCUMENTS

DE        2442912 A1 *  3/1976  ............... F01C 1/46

*Primary Examiner* — Thai Ba Trieu
(74) *Attorney, Agent, or Firm* — R. Scott Kimsey, Esq.; Klein DeNatale Goldner

(57) ABSTRACT

A rotary engine includes a rotor coupled to a shaft, the rotor having a first side wall, a second opposing side wall, and a rim extending between the first side wall and the second side wall. A piston extends from the rim of the rotor. A pressure chamber is defined by a face of the piston, the interior surface of a housing, and the rim of the rotor. An inlet directs fluid through the housing and into the pressure chamber. A backpressure flap is pivotably attached to the interior surface of the housing. An outlet directs fluid from the pressure chamber to the exterior of the housing. An effluent flap is pivotably attached to the interior surface of the housing. The inlet and outlets are closed when their respective flaps sealingly engage an interior surface of the housing.

11 Claims, 19 Drawing Sheets

(56) References Cited

U.S. PATENT DOCUMENTS

| | | | | | |
|---|---|---|---|---|---|
| 3,220,388 | A | * | 11/1965 | Trotter | F02B 53/00 123/228 |
| 3,692,002 | A | * | 9/1972 | Williams | C13B 10/107 123/206 |
| 3,913,534 | A | * | 10/1975 | Bratten | F01C 1/46 123/213 |
| 4,047,857 | A | * | 9/1977 | Fischer | F01C 1/46 418/153 |
| 4,086,881 | A | * | 5/1978 | Rutten | F01C 1/46 123/228 |
| 4,178,900 | A | * | 12/1979 | Larson | F01C 1/46 123/244 |
| 4,286,555 | A | * | 9/1981 | Williams | F01B 1/12 123/228 |
| 4,342,296 | A | * | 8/1982 | Williams | F01B 1/12 123/228 |
| 4,860,704 | A | * | 8/1989 | Slaughter | F02D 17/04 123/237 |
| 4,967,707 | A | * | 11/1990 | Rogant | F01C 1/46 123/228 |
| 7,308,884 | B2 | * | 12/2007 | Tathuzaki | F01C 1/44 123/228 |
| 8,936,004 | B1 | * | 1/2015 | Buchanan | F01C 1/06 123/228 |

* cited by examiner

ROTARY ENGINE

RELATED APPLICATIONS

Not Applicable.

BACKGROUND AND FIELD

1. Field

The present device relates generally to the field of rotary engines, and more specifically to a high-efficiency rotary engine with reduced friction loss as compared to the prior art.

2. Background

Rotational engines are known in the art. Currently-known rotary engines have a variety of disadvantages, however. Such disadvantages include thermal disparities across the engine, low thermal efficiency, and problems with sealing the various components of the engine. Additionally, such engines suffer from pressure within the pressure vessel fighting against itself when intended to pressurize one component of the pressure vessel.

SUMMARY

One aspect of the present disclosure provides a rotary engine including a rotor coupled to a shaft such that rotation of the rotor causes a corresponding rotation of the shaft. The rotor comprises a first side wall, a second opposing side wall, and a rim extending between the first side wall and the second side wall. A piston extends from the rim of the rotor and includes a sloping rear face and a front face. A housing encompasses the rotor and the piston, with a portion of the piston at the junction of the sloping rear face and the front face being sealingly engaged with an interior surface of the housing. A pressure chamber is defined by a face of the piston, the interior surface of the housing, and the rim of the rotor. An inlet directs fluid through the housing and into the pressure chamber. A backpressure flap is pivotably attached to the interior surface of the housing and is configured to move between sealing engagement with the interior surface of the housing and sealing engagement with the rim of the rotor. The inlet is closed when the backpressure flap is in sealing engagement with the interior surface of the housing. An outlet directs fluid from the pressure chamber to the exterior of the housing. An effluent flap is pivotably attached to the interior surface of the housing and configured to move between sealing engagement with the interior surface of the housing and sealing engagement with the rim of the rotor. The outlet is closed when the outlet flap is in sealing engagement with the interior surface of the housing.

In another aspect of the present disclosure, the rotary engine includes a piston position sensor embedded within the housing and configured to detect the passage of the piston in proximity thereto.

In another aspect of the present disclosure, the rotary engine includes an inlet valve attached to the housing and configured to selectively open and close the inlet.

In another aspect of the present disclosure, the rotary engine includes a control processor in electronic communication with the inlet valve for controlling the opening and closing of the inlet valve.

In another aspect of the present disclosure, the rotary engine includes an outlet valve attached to the housing and configured to selectively open and close the outlet, and the control processor is in electronic communication with both the inlet valve and the outlet valve for controlling the opening and closing of the valves.

In another aspect of the present disclosure, the rotary engine includes an injector configured to inject either steam or an air/fuel mixture into the pressure chamber.

In another aspect of the present disclosure, the injector is configured to inject an air/fuel mixture into the pressure chamber, and the rotary engine includes an igniter to ignite the air/fuel mixture upon injection into the pressure chamber.

Another aspect of the present disclosure provides a rotary engine having a rotor coupled to a shaft such that rotation of the rotor causes a corresponding rotation of the shaft. The rotor includes a first side wall, a second opposing side wall, and a rim extending between the first side wall and the second side wall. A plurality of pistons extend from the rim of the rotor. Each of the plurality of pistons includes a sloping rear face and a front face, and each is equidistance from each adjacent piston. A housing encompasses the rotor and the plurality of pistons. Each of the pistons sealingly engages the interior surface of the housing at a junction between the rear face and the front face of the respective piston. The rotary engine also includes a plurality of inlet/outlet pairs, each including a first opening defined in the housing and extending from an exterior to an interior thereof, and a second opening defined in the housing and extending from an exterior to an interior thereof. Each inlet/outlet pair is equidistant from each adjacent inlet/outlet pair. A plurality of backpressure flaps are each pivotably attached to the interior of the housing and configured to move between a first position, in which the backpressure flap sealingly engages the interior surface of the housing, and a second position, in which the backpressure flap sealingly engages the rim of the rotor. When in the first position, each of the backpressure flaps closes an adjacent inlet. The rotary engine also includes a plurality of effluent flaps. Each effluent flap is pivotably attached to an interior of the housing and configured to move between a first position, in which the effluent flap sealingly engages the interior surface of the housing, and a second position, wherein the effluent flap sealingly engages the rim of the rotor. When in the first position, each effluent flap closes an adjacent outlet.

In another aspect of the disclosure, the rotary engine includes a piston position sensor disposed within the housing and configured to detect the passage of one of said plurality of pistons in proximity thereto.

Still another aspect of the present disclosure provides a rotary engine including a rotor having a rim and a piston disposed on the rim of the rotor. A housing sealingly engages the rotor and the piston, and also defines a pressure chamber between the rotor, the piston, and an interior wall of the housing. The housing also defines an inlet configured to allow fluid to flow into the pressure chamber, and an outlet configured to allow fluid to flow out of the pressure chamber. A backpressure flap is pivotably attached to the interior wall of the housing and operable to move between a first position, in which the edge of the backpressure flap sealingly engages the rim of the rotor, and a second position, in which the backpressure flap closes the inlet. An effluent flap is pivotably attached to the interior wall of the housing and operable to move between a first position, in which the effluent flap sealingly engages the rim of the rotor, and a second position, in which the effluent flap closes the outlet. Fluid flowing into the rotor through the inlet impinges upon the piston, causes rotation of the rotor.

DETAILED DESCRIPTION

The present rotary engine directly converts fluid motion, the products of fuel combustion, or the adiabatic expansion of a pressurized, compressible fluid into rotational motion with limited energy losses that are due to friction only. Backpressure is greatly reduced or eliminated from the present rotary engine design. The present rotary engine is able to operate at much closer to ambient temperatures and pressures than previous designs, thus making the thermal envelope easier to control and reducing thermal losses to a minimum.

Figure 1:
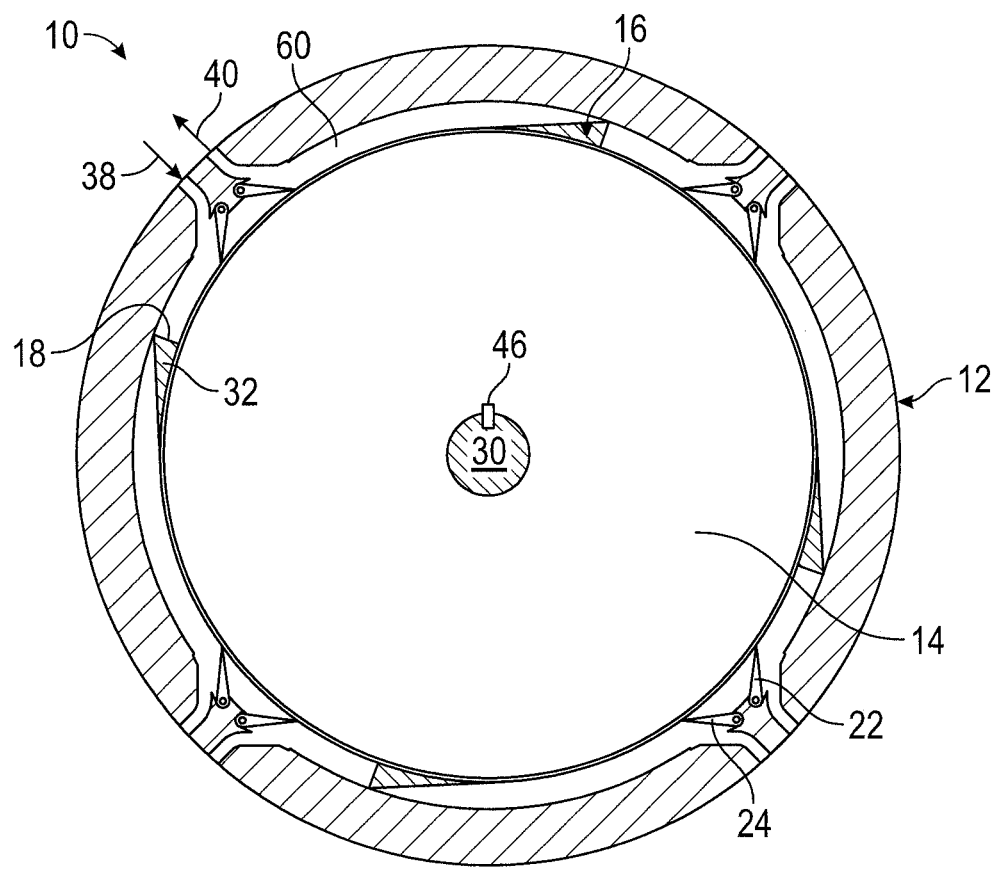
FIG. 1 is a sectional view of one embodiment of a rotary engine of the present disclosure taken along line 2-1 of FIG. 2.
Figure 2:
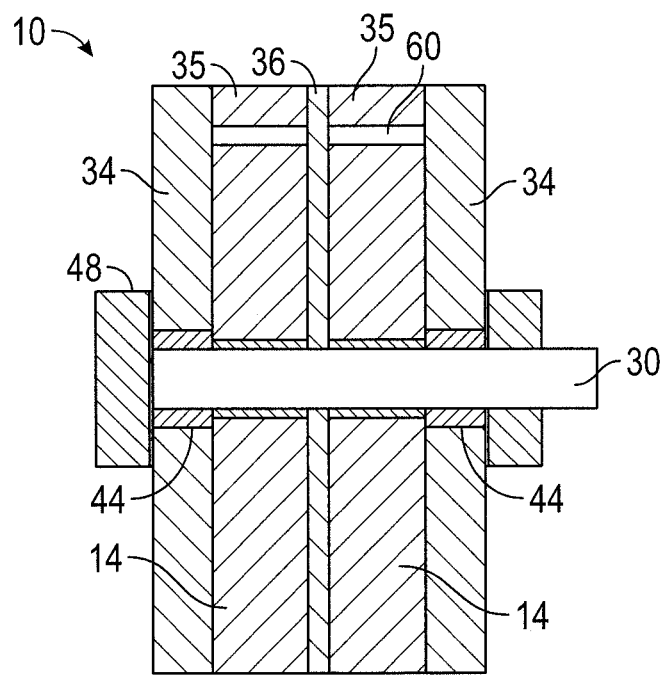
FIG. 2 is a lateral cross-section view of one embodiment of a rotary engine of the present disclosure.

Turning to the drawings, wherein like numerals indicate like parts, FIG. 1 depicts a cross-section view of an exemplary embodiment of a rotary engine 10 of the present disclosure. The embodiment shown includes a rotor 14 disposed on a torque shaft 30, which extends through the center of rotor 14. Rotor 14 is disposed within a nacelle or housing 12, a portion of which is visible in FIG. 1. Housing 12 includes stator end plates 34, stator middle plate 36, end caps 48, and stator housing rings 35, as best shown in FIG. 2. A plurality of pistons 16 are disposed on the outer face of rotor 14, between that surface and the inner surface of housing 12.

Figure 20:
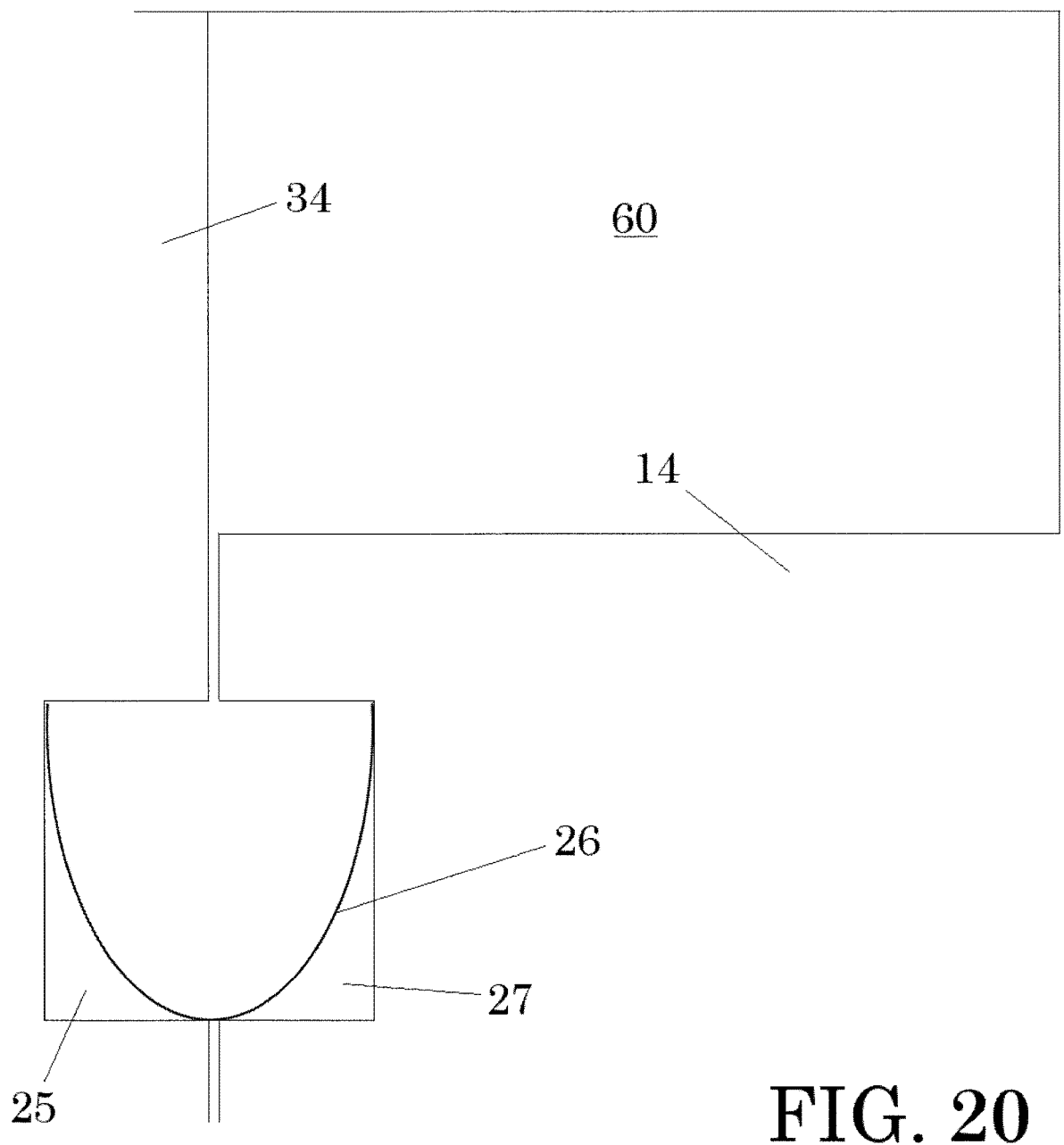
FIG. 20 is a schematic representation of seal engagement of one embodiment of the present disclosure.

Pistons 16 have a generally ramp-like structure, with each piston 16 having a piston face 18 and a piston body 32, the piston body 32 extending away from piston face 18 at an incline until flush with the outer face of rotor 14. Piston face 18 includes a piston face seal, which is in sealing engagement with the piston as well as housing 12 and one or more stator structures, such as stator end plate 34 and/or stator middle plate 36, described in more detail below. It is contemplated that piston face seals may be constructed from high-temperature spring steel, and that spring-like forces may be used to contain the friction pressure of the seal to a known maximum. In such embodiments, the wear on the seal resulting from use of rotary engine 10 is compensated for by spring travel. Alternatively, the piston face seals 6 may be constructed from a hard, stiff, tight-tolerance sealing material in sealing engagement with the inside of housing 12 and the applicable stator structures. Such seals may be installed tighter than desired in use, and rotor 14 rotated until the seals wear in to a constant minimum friction level. FIG. 20 provides a schematic representation of a seal 26 between stator end plate 34 and rotor 14, which is depicted in an enlarged section showing the engagement of the seal with other components of the device. In the embodiment shown, seal 26 is a horseshoe one-piece ring seal constructed of high-temperature spring steel and is seated in groove 25 in stator side plate 34 and a groove 27 in rotor 14. Pressure within pressure chamber 60 acts on seal 26, forcing the upper sides of the seal (in the orientation shown in the drawings) against both the stator end plate and rotor. While the embodiment shown in the drawings is one embodiment of a seal structure suitable for use with the device of the present disclosure, it is contemplated that any suitable seal structure may be utilized.

Backpressure flaps 22 are pivotably attached the inside surface of housing 12 and sealed against the inside of housing 12, including applicable stator structures at the flap's pivot point. As can be seen from FIG. 1, backpressure flaps 22 are static, relative to rotor 14. Backpressure flaps 22 create a closed volume in conjunction with a piston face 18, on one end, the backpressure flap 22 on the other end, the interior surface of housing 12 and the outer face of rotor 14, including any applicable stator structures. These enclosed areas are referred to herein as pressure chambers 60. The volumes contained within pressure chambers 60 are sealed and, in use, may contain a pressurized, heated gas. The only surfaces in motion relative to the gas are piston faces 18, and all work done by the pressurized, heated gas is done to the rotor 14 via the pressure exerted on piston faces 18. With backpressure flaps 22 opposing the piston faces 18, the only losses during use of rotary engine 10 are the friction losses at the seals and the ends of the various flaps sliding against the rotor, as well as any applicable thermal losses.

Although backpressure flaps 22 reduce or eliminate backpressure on pistons 16 on the cylinder side of the pistons, it is also desirable to reduce or eliminate backpressure on the piston surfaces opposite piston face 18—in other words, on the effluent side of pistons 16. Effluent flaps 24 are employed for this purpose. Effluent flaps 24 are also pivotably attached to housing 12 and sealed in a manner similar to that of backpressure flaps 22. The function of effluent flaps 24 is to guide gas or liquid on the back side of pistons 16 out of the pressure chamber described above. A set of backpressure flaps 22 and effluent flaps 24 are provided for each piston on the rotor.

Housing 12 defines a plurality of inlets 38 and outlets 40 therethrough. Gas or liquids, including, in some embodiments, combustible fuels, are introduced into one of the pressure chambers of the device via inlet 38. In adiabatic steam and internal combustion embodiments of the present rotary engine, described more fully below, steam or an air/fuel mixture is preferably introduced into the pressure chamber by an injector valve 50 (show, for example, in FIG. 3) configured to deliver precise amounts of gas or liquid to the chamber. Inlets 38 are maintained in either open or closed positions by backpressure flaps 22. Effluent gas or liquid exits the system through an outlet 40, which may be open or closed via an effluent flap 24. In embodiments of the present rotary engine employing steam or internal combustion, timing of the injection of steam, or of the air/fuel mixture, into the pressure chamber via an inlet 38 may be controlled by a feedback loop from the effluent pressure. The timing is preferably adjusted to leave the effluent pressure low, but to maintain enough pressure and temperature to remain vaporous during delivery to a reservoir where the steam can be staged for another cycle through the engine.

It should be noted that during normal operation of rotary engine 10, the steam on the back side of a piston 16 will have been expanded to at or near zero gauge pressure before the piston 16 reaches an effluent flap 24. The pressure on the back side of the piston 16 will therefore be at or near zero gauge and will remain as such as the steam is evacuated to a low-pressure reservoir (or to the atmopshere, in some embodiments of rotary engine 10).

It is contemplated that embodiments of the present rotary engine 10 may have an adiabatic expansion mode, a fluid energy mode, or an internal combustion mode.

In adiabatic mode, a controlled volume of compressed gas is injected into the pressure chambers at a known initial pressure. The gas expands against pistons 16 at one end of the pressure chamber, and against backpressure flaps 22 at the other end in order to rotate the piston against a load. As the process is adiabatic, no heat energy is lost out of the envelope and the temperature of the gas drops only as a result of the drop in pressure resulting from expansion of the gas. The temperature drops linearly with pressure because all of the heat energy of the gas is used to do the work of expansion. In a theoretical engine, in which the pressure chamber expands to zero gauge pressure and all of the heat energy available in the gas is used to rotate the piston, 100% efficiency would be achieved. It is an object of the present rotary engine to achieve an efficiency of 100%, minus the friction losses in the system described below, minus any energy utilized to return gas or fluid to a reservoir. It is contemplated that an engine having 90% efficiency may be achieved. Heat losses are negligible due to the speed and high energy at which pressure-volume work is being extracted from the system.

In a rotary engine utilizing a fluid energy mode, a moving fluid under pressure (such as wind, water, or the like), at any available initial pressure, is directed into various pressure chambers, placing pressure against the pistons. This pressure is reacted by the backpressure flaps, described below, thereby causing the pistons to rotate the rotor against a load.

FIG. 2 provides an axial cross-section view of the rotary engine 10 of FIG. 1. As can be seen in the figure, two rotors 14 are utilized, each disposed on torque shaft 30. Also depicted are stator side plates 34, stator housing rings 35, and stator middle plate 36, which separates the two rotors. End bearings 44, rotor keys 46, and end cap 48 are likewise shown. Rotor keys 46 serve to keep rotors 14 properly synchronized with the injections of steam into pressure chambers 60, and with one another. Rotor shaft 30 holds rotors 14 in position as they spin, and rotor keys 46 prevent rotors 14 from spinning on the shaft. Rotors 14 preferably remain staggered at halfway through the piston stroke. In some embodiments, rotor shaft location information is used to control the injectors and flaps of the system. Piston face seals and rotor side seals are preferably used to maintain pressure within pressure chamber 60, with piston face seals providing sealing engagement between the pistons and components of the housing (i.e. stator housing rings 35), while rotor side seals provide for sealing engagement between the rotor and a stator end plate, on one side of the rotor, and stator middle plate 36 on the other side of the rotor.

Figure 3:
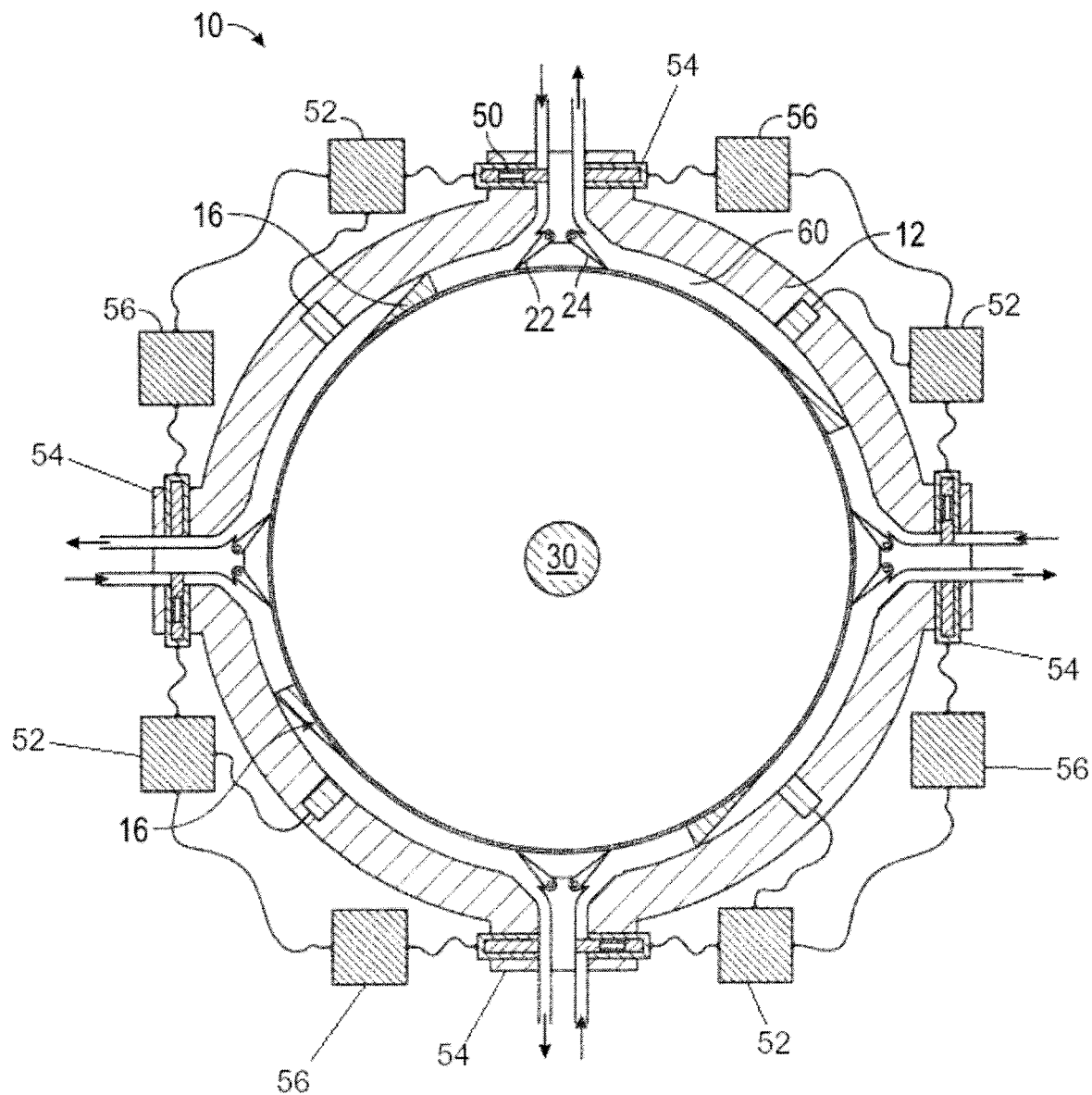
FIG. 3 depicts one alternative embodiment of a rotary engine of the present disclosure.

FIG. 3 depicts an alternative embodiment of rotary engine 10 having additional operational and control elements, which are described in more detail below. Shown are electromechanical injector valve 50, injector valve control processor 52, piston position sensor 70, and temperature and pressure sensor 54, and temperature and pressure processor 56.

Example 1—Adiabatic Expansion Mode (Steam)

The following description sets forth the operation of an exemplary embodiment of rotary engine 10 relying on the adiabatic expansion of steam. Although steam is utilized in the following example, it is contemplated that any suitable substance capable of undergoing adiabatic expansion may be utilized. Reference is made to elements described above and shown, for example, in FIGS. 1 and 2.

As noted above, embodiments of the present rotary engine operating in an adiabatic steam mode preferably include injector valves 50 for injecting precise volumes of steam into pressure chambers 60. Injector valves 50 may be positioned as shown, for example, in FIG. 3, or at any suitable location upstream of a pressure chamber 60.

Figure 4:
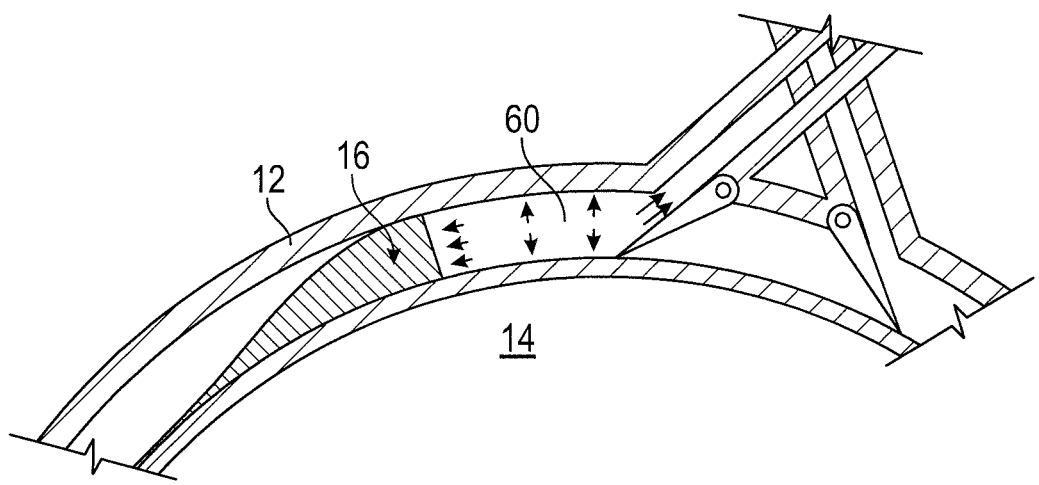
FIG. 4 is a close view of a portion of a rotary engine of the present disclosure configured for adiabatic expansion mode.

Although the operation of the device is cyclic, the beginning of the process may be seen as the introduction of an initial volume Vi of steam at an initial pressure Pi into the pressure chamber by injector valve 50. Immediately upon injection of the steam into the pressure chamber, the timed closing of injector valve 50 and backpressure flap 22 occurs, thereby sealing the volume Vi against piston face 18 at one end of the pressure chamber. The expanding steam pushes against the piston face 18 and rotates rotor 14, thereby reacting the piston face pressure against backpressure flap 22 and injector valve 50. FIG. 4 shows the forces between the housing and the piston that cause rotor 14 to rotate about its central axis of rotation. As the pressure of the steam is reacted against the components of a pressure chamber 60 and a piston 16 the only component capable of movement relative to housing 12 is rotor 14. Thus, all work performed by expansion of the steam is performed on rotor 14 via pistons 16.

Figure 5:
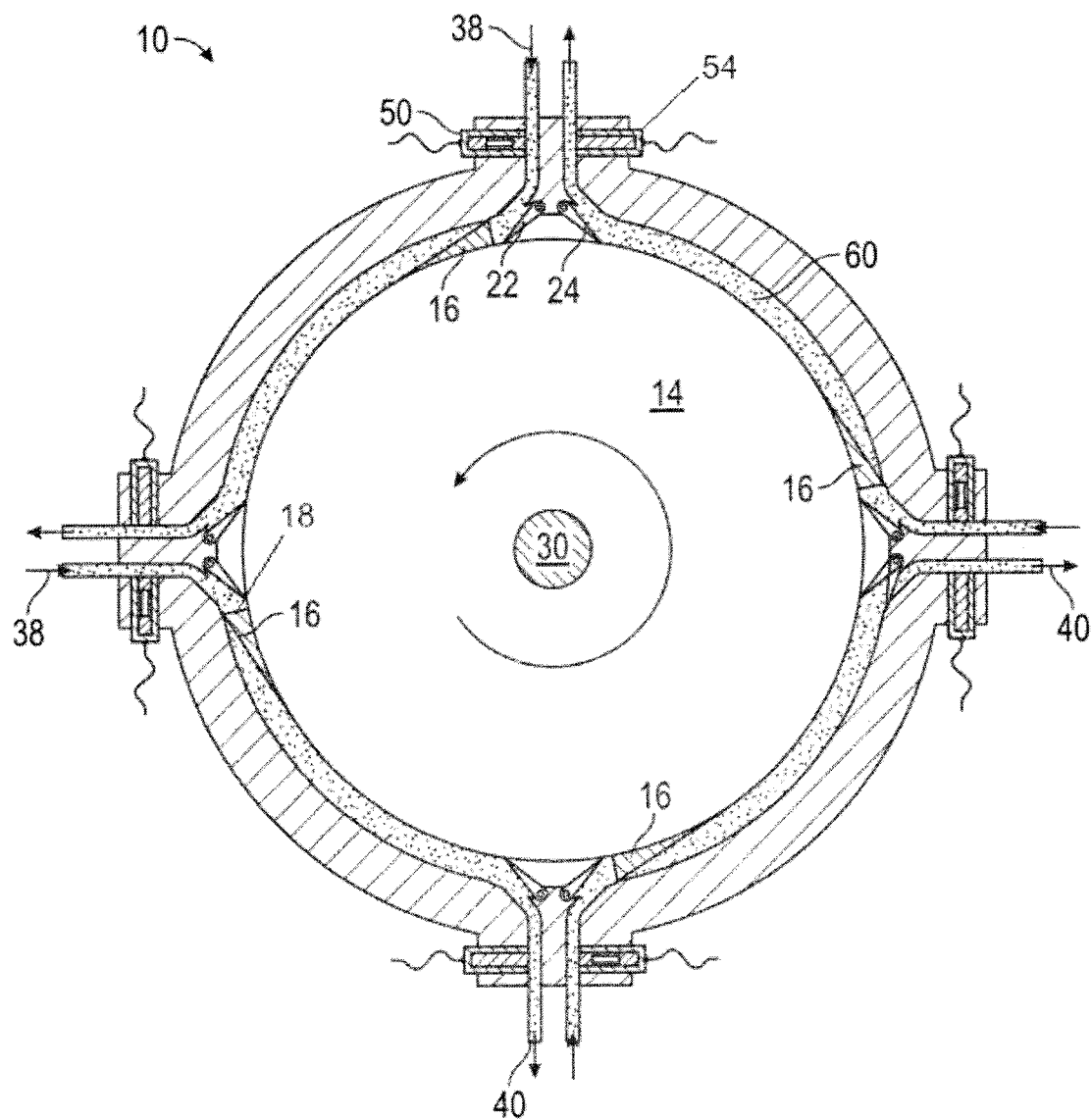
FIG. 5 is a section view of one embodiment of a rotary engine of the present disclosure configured for adiabatic expansion mode.
Figure 6:
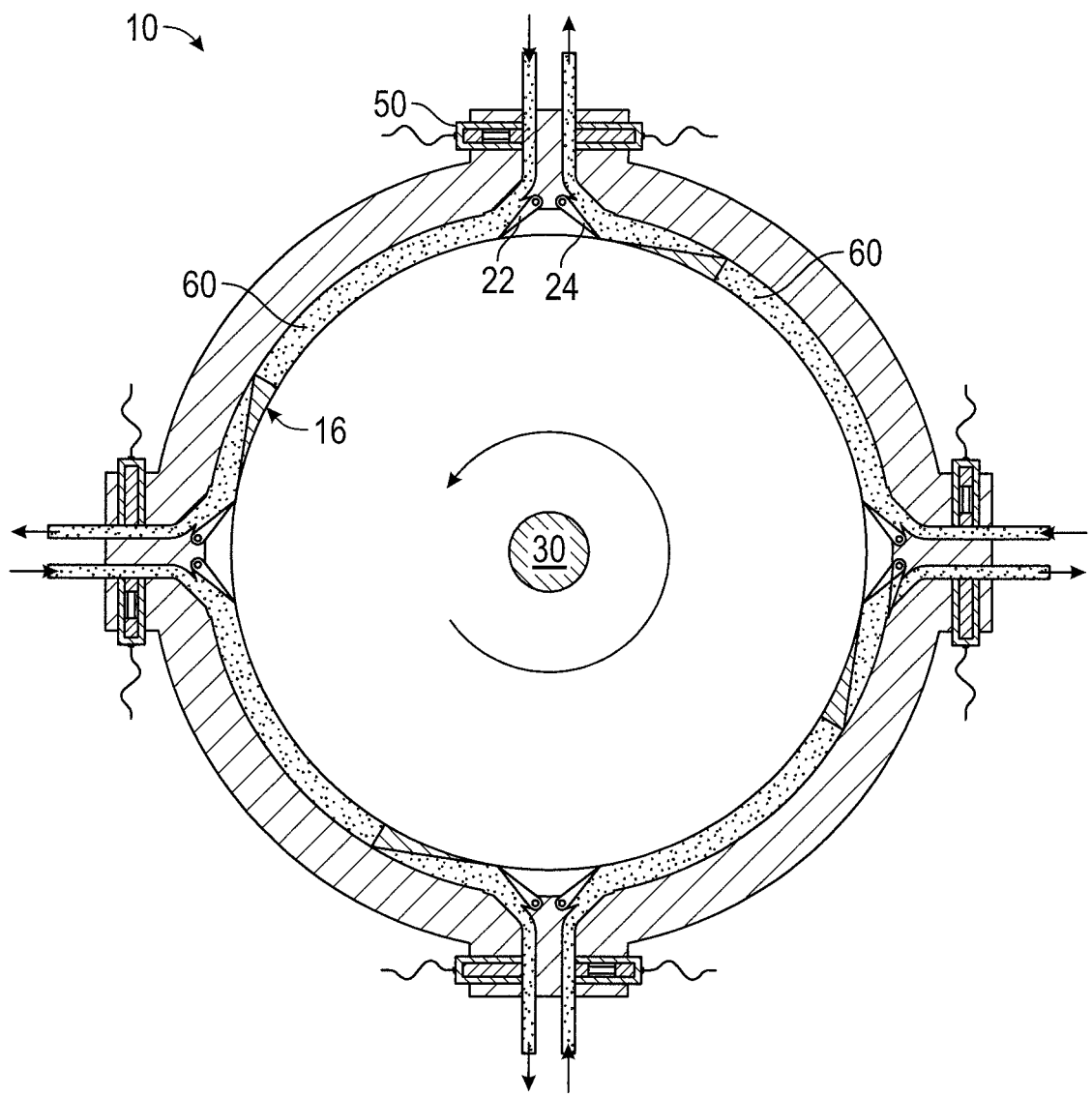
FIG. 6 is a section view of the device of FIG. 5 showing an adiabatic expansion in a more progressed state.
Figure 7:
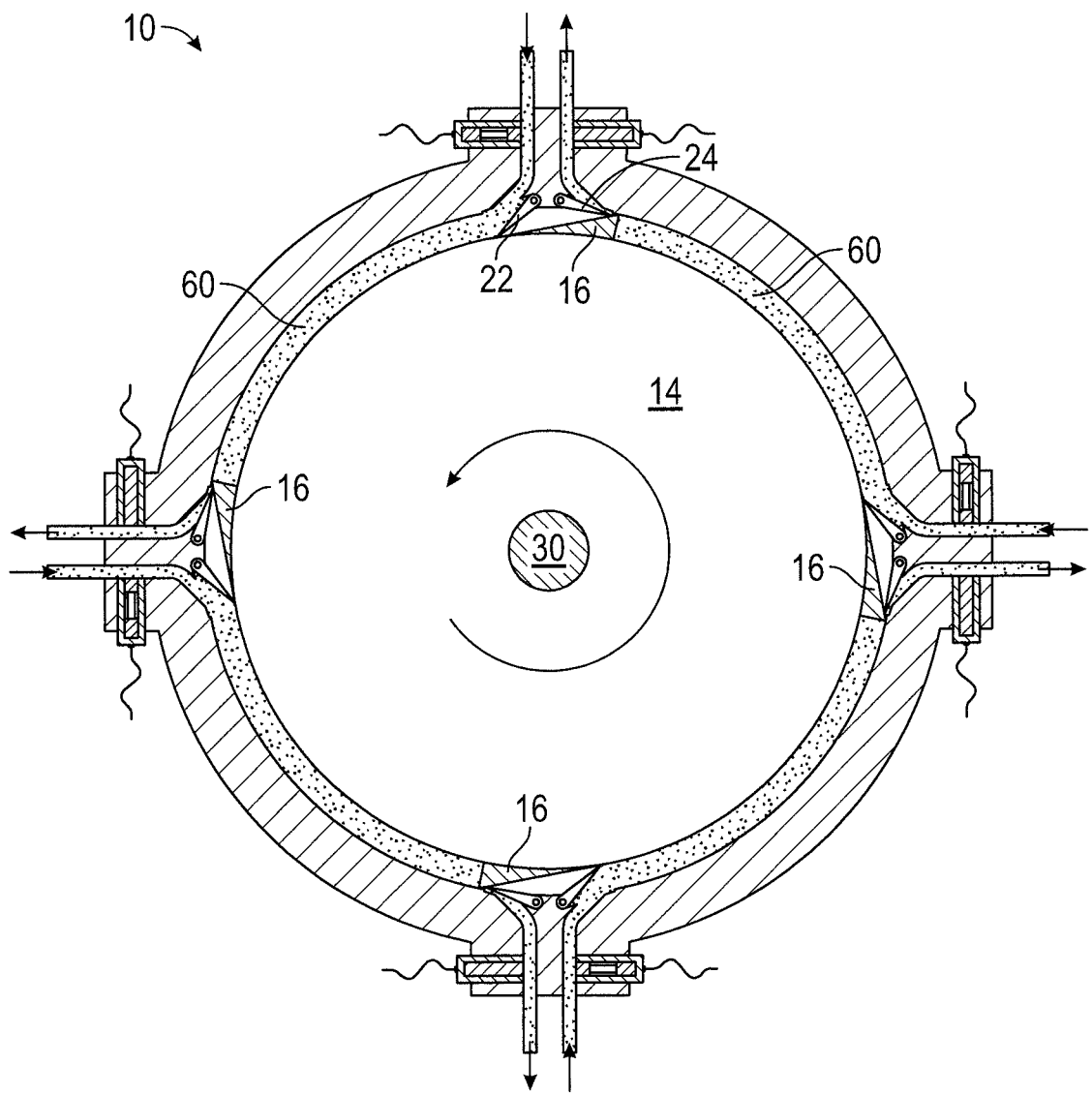
FIG. 7 is a section view of the device of FIG. 5 showing an adiabatic expansion in a more progressed state.

FIG. 5 depicts an early position of rotor 14 due to adiabatic expansion of steam within the pressure chambers 60. Steam having a temperature and pressure able to perform work expands adiabatically against piston faces 18, backpressure flaps 22, and the other components of the pressure chambers 60. Cool, low-pressure steam is forced out of the system via outlets 40. FIG. 6 depicts a continuation of the rotation of rotor 14 shown in FIG. 5. Effluent flaps 24 remain open at this point in the process. Backpressure flaps 22 are also open and will remain open until forced closed by the travel of pistons 16. FIG. 7 depicts the state of rotary engine 10 as rotor 14 continues to rotate due to the ongoing expansion of steam in the pressure chamber. The effluent flaps 24 have been forced to almost a closed position at this point, while backpressure flaps 22 remain open.

Figure 8:
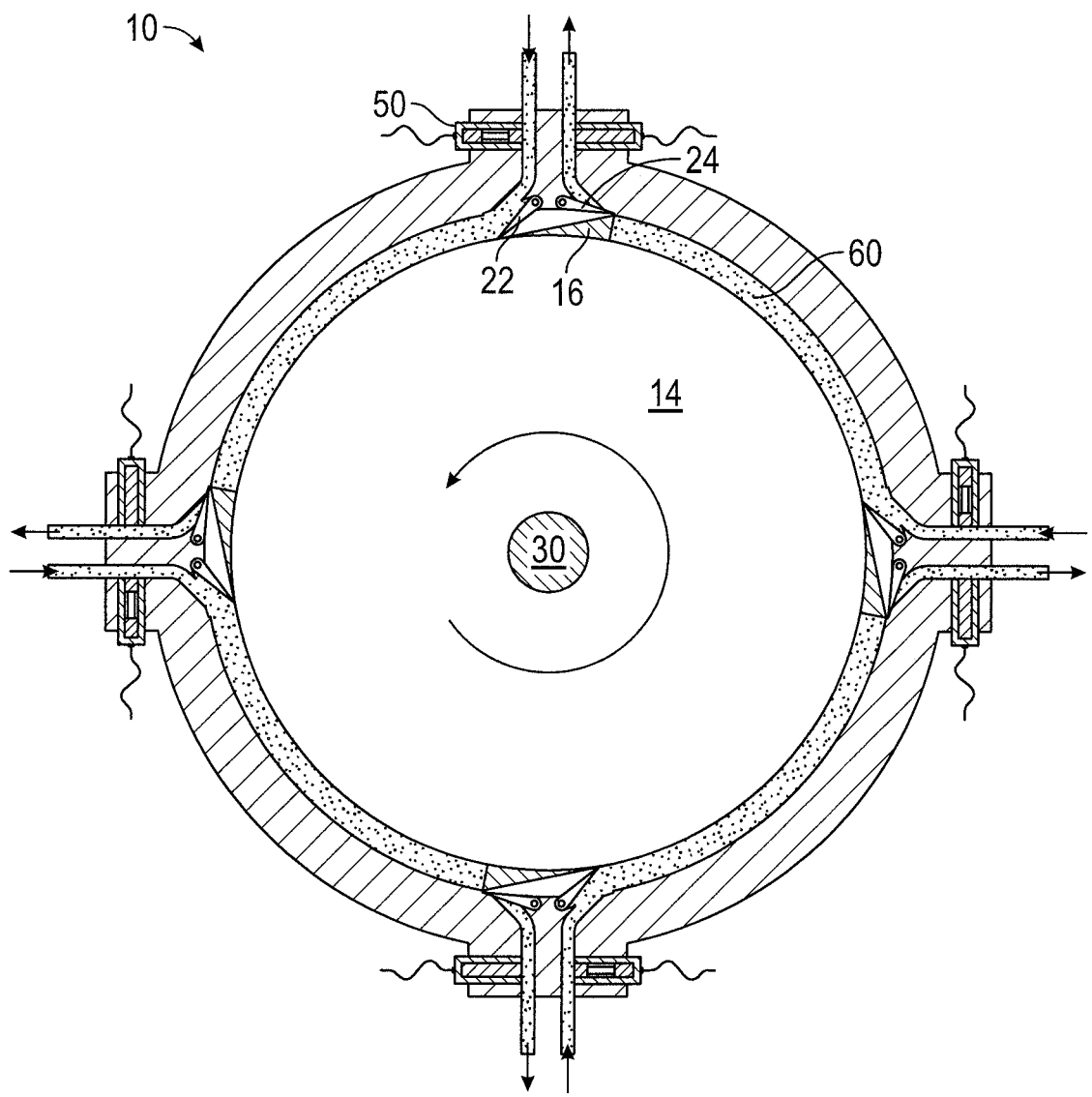
FIG. 8 is a section view of the device of FIG. 5 showing an adiabatic expansion in a more progressed state.
Figure 9:
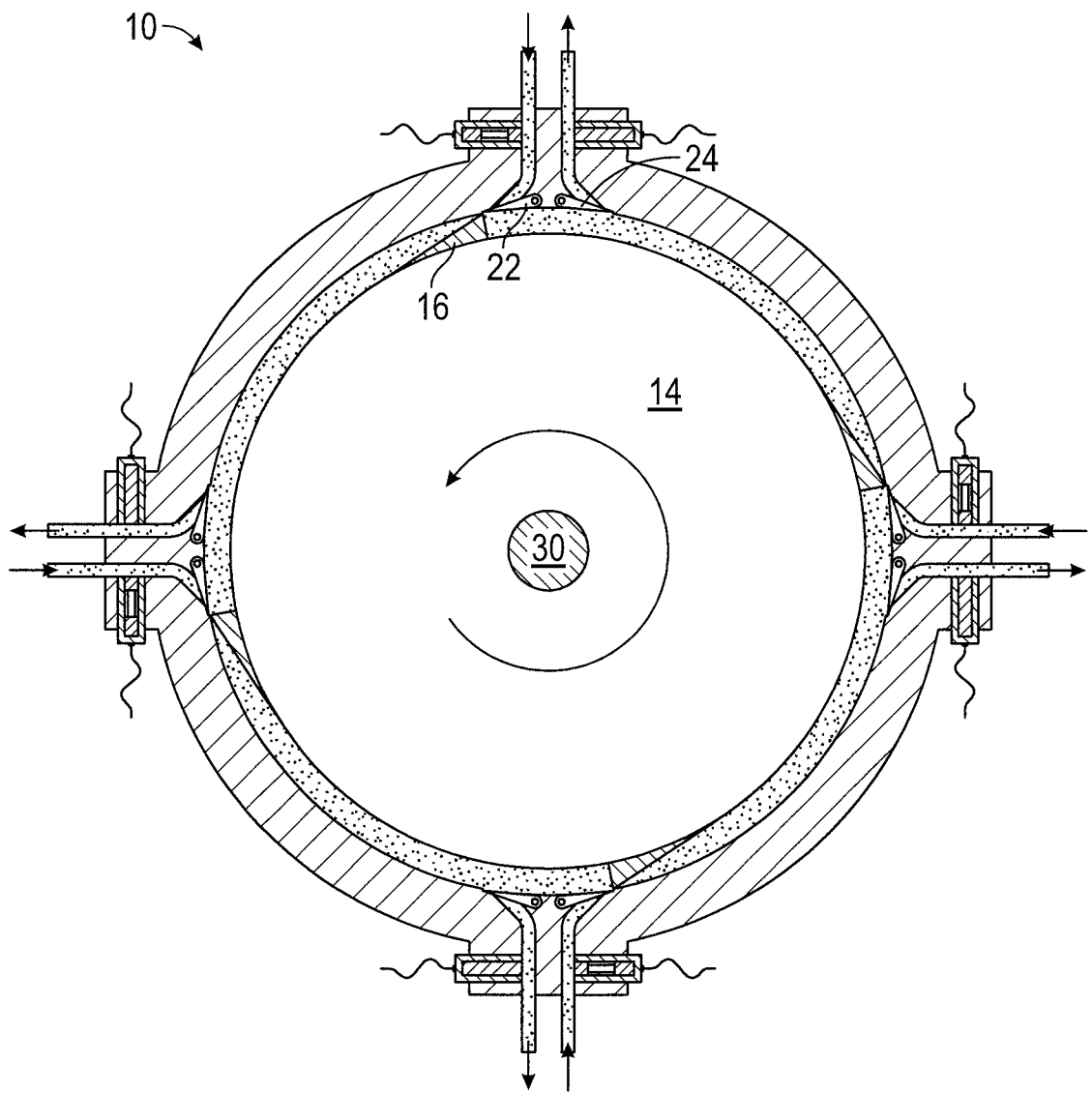
FIG. 9 is a section view of one embodiment of the device of FIG. 5 showing an adiabatic expansion in a more progressed state, immediately prior to returning to the state shown in FIG. 5.

FIG. 8 depicts the continued rotation of rotor 14, wherein the pistons 16 have forced effluent flaps 24 fully closed. FIG. 9 depicts further rotation of rotor 14, wherein the pistons 16 have moved past effluent flaps 24 and are just at the edge of backpressure flaps 22, holding those flaps in the closed position. It should be noted that effluent flaps 24 also remain closed. Retaining effluent flaps 24 in the closed position until backpressure flaps 22 reopen and additional steam is injected into pressure chambers 60 allows expansion of steam through the full 360-degree rotation of rotor 14, without back-vacuum created in dead spaces within rotary engine 10. After the state depicted in FIG. 9, rotor 14 moves back into the state shown in FIG. 5, with the process beginning again via opening of both the backpressure flaps 22 and the effluent flaps 24, along with a new injection of steam in the pressure chambers.

Example 2—Fluid Energy Mode

In this mode of a rotary engine 10, a moving fluid under pressure is directed into the rotational volume (pressure chambers 60) of the engine to place pressure against pistons 16. The fluid introduced may be an incompressible fluid (such as water, for example), or a compressible fluid (such as pressurized gas, for example). The volume of fluid placing pressure against pistons 16 is reacted by backpressure flaps 22, thereby causing pistons 16 to rotate against a load. Fluid energy mode embodiments of the present device do not require timing of any inlet valves associated therewith. Instead, inlets 38 are simply opened, allowing fluid to flow continuously at the maximum available pressure and velocity. The fluid energy mode of the present device differs from the adiabatic mode in that, among other things, the pressure curves as a function of piston position differences between the two embodiments of the present device. In the adiabatic embodiment, the pressure within the system starts at a maximum Pi and ends at zero gauge Pf in direct proportion to the volume in the chamber. In the fluid energy mode embodiment of the present device, the pressure is constant or non-proportional to the volume in the chamber.

Figure 10:
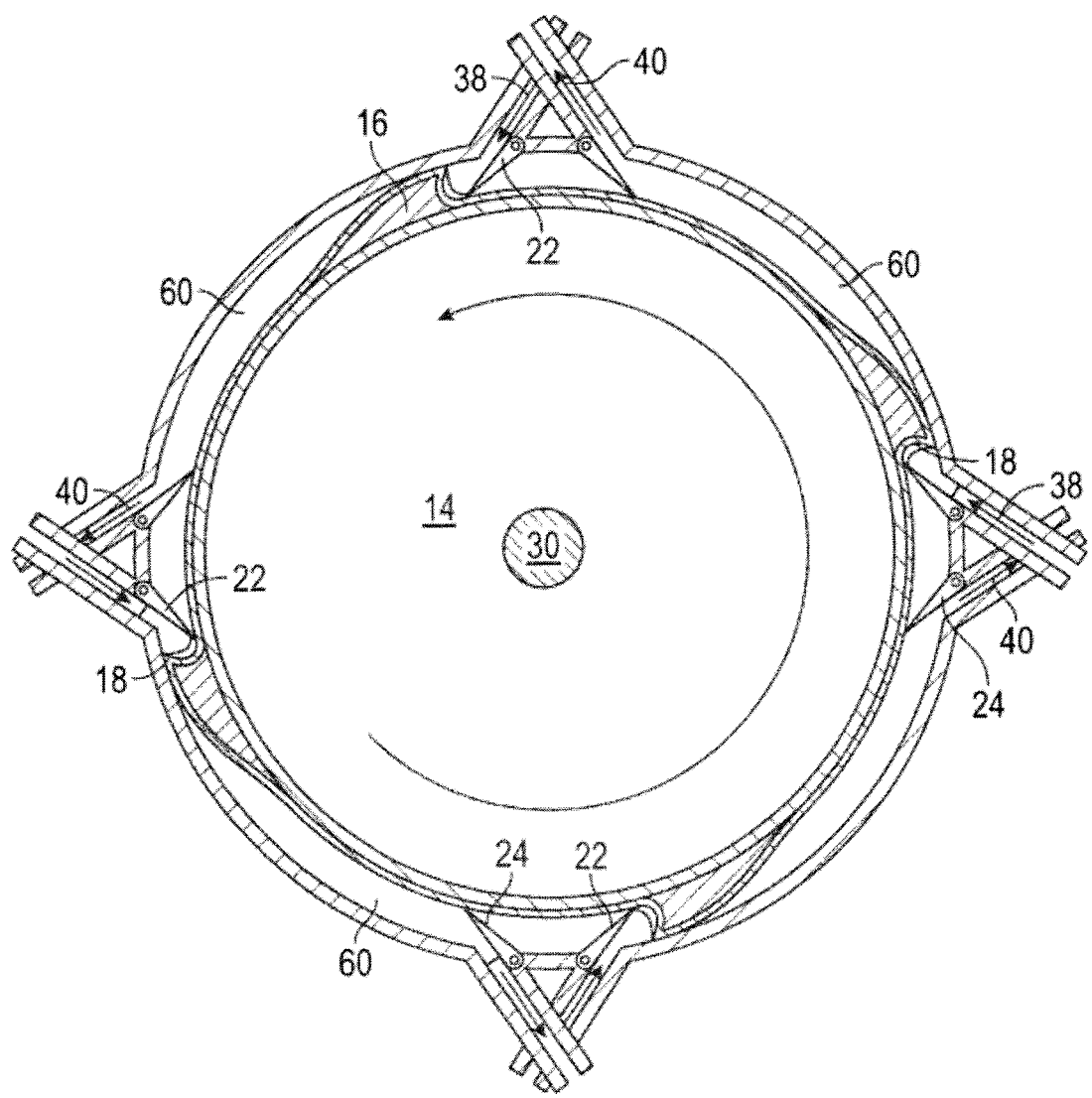
FIG. 10 is a section view of one embodiment of a rotary engine of the present disclosure configured for fluid energy mode.

FIG. 10 depicts an embodiment of rotary engine 10 configured for use in a fluid energy mode. In the embodiment shown, fluid enters into the engine via inlets 38. Fluid entering the engine preferably does so at maximum system pressure. Inlet 38 remains open during the operation of rotary engine 10, and the operation of rotary engine 10 can be halted by ceasing delivery of fluid into the system through inlet 38. Fluid entering the engine flows into pressure chambers 60 at an initial (preferably maximum) pressure Pi. When the engine is in the state shown in FIG. 10, fluid present as backvolume within the system is at zero gauge pressure (Pf) and flows out of the system via outlets 40. Also as shown in the figure, when rotary engine 10 is in the state depicted, backpressure flaps 22 and effluent flaps 24 operate simultaneously to prevent creation of a dead space between the two flaps, thereby preventing the creation of suction on pistons 16.

Figure 11:
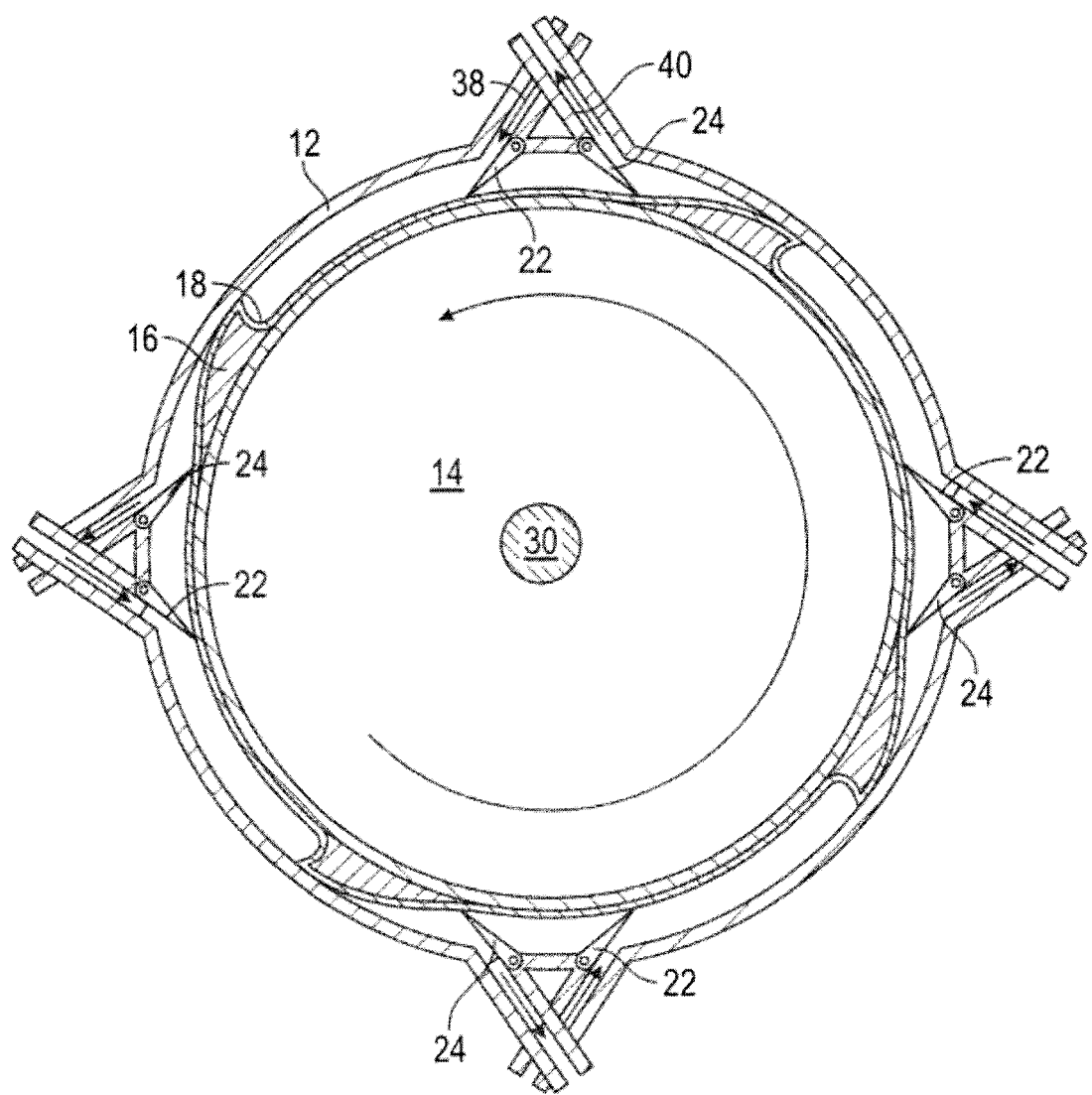
FIG. 11 is a section view of the device of FIG. 10 showing fluid energy expansion in a more progressed state.

FIG. 11 shows the embodiment of rotary engine 10 shown in FIG. 10 as the engine continues to operate as a result of the introduction of pressurized fluid into the system. Fluid within pressure chambers 60 places pressure upon pistons 16, backpressure flaps 22, and the fluid source. The only component of the system able to move in response to this pressure is rotor 14, and thus the pressurized fluid within the pressure chamber 60 causes rotor 14 (and therefore torque shaft 30) to rotate via pistons 16.

Figure 12:
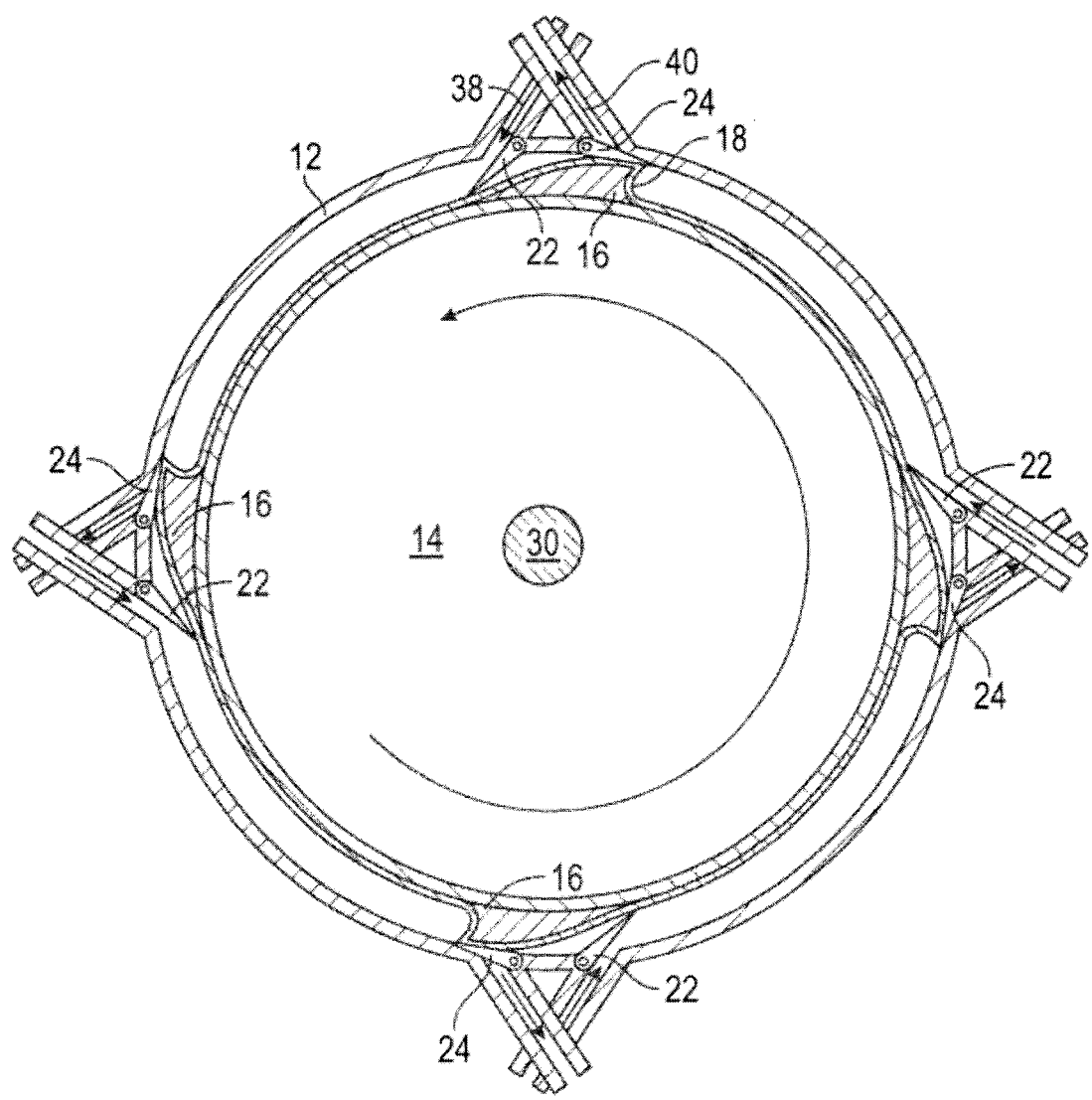
FIG. 12 is a section view of the device of FIG. 10 showing fluid energy expansion in a more progressed state.
Figure 13:
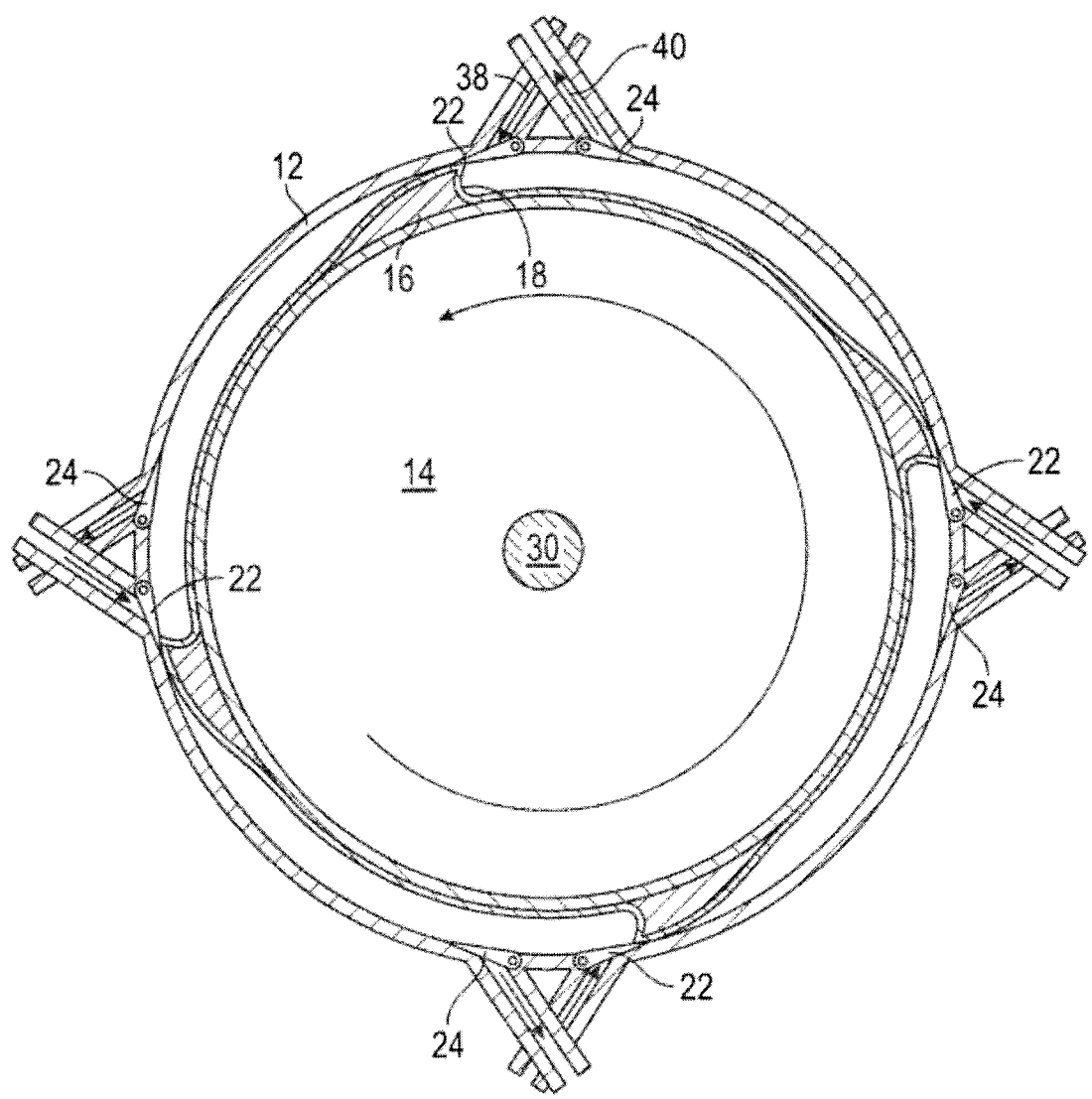
FIG. 13 is a section view of the device of FIG. 10 showing fluid energy expansion in a more progressed state immediately prior to returning to the state of FIG. 9.

FIG. 12 shows a subsequent stage of the embodiment of rotary engine 10 shown in FIGS. 10 and 11. As shown in the figure, pressurized fluid continues to enter pressure chambers 60 via inlets 38. Backpressure flaps 22 remain open at this stage, and each respective backpressure flap will continue to remain open until face 18 of a piston 16 passes the flap. Effluent flaps 24, on the other hand, have been moved into the closed position by travel along the ramped surfaces that form the back portions of each of pistons 16.

in the stage of the embodiment of rotary engine 10 shown in FIG. 13, the backpressure flaps 22 and the effluent flaps 24 are all fully closed. The backpressure flaps 22 have been closed by the action of pistons 16, and effluent flaps 24 are held closed by the system at this point (and may be held closed in any suitable manner). Retaining the effluent flaps 24 in the closed position until backpressure flaps 22 reopen and allow additional fluid into the system allows the fluid already contained within the system to flow through the full 360 degrees of rotation of the device without creation of "back-vacuum" in dead space. It should be noted that while the backpressure flaps are closed at this stage, inlets 38 remain open. After the stage of the rotary engine shown in FIG. 13, the engine returns to the state shown in FIG. 9.

Example 3—Internal Combustion Engine

Embodiments of the present device configured for internal combustion mode operate via a rotating piston that requires only one stroke to exhaust the combustion byproducts, rather than two strokes or more as required by standard reciprocating internal combustion engines. The rotation operation of the present device, as well as its single-stroke exhaust, renders the present engine more efficient than a reciprocating internal combustion engine. The present engine is also more efficient than a Wankel engine, or previous attempts at a rotation internal combustion engine, due to the fact that the present engine is a single-stroke engine and has fewer moving parts.

As opposed to embodiments of the present device configured to operate in an adiabatic mode, a computer-timed fuel aeration and injection system is preferably utilized in conjunction with the internal combustion mode engine. The fuel/air mixture is injected into the rotational volume (i.e. pressure chambers 60) and immediately combusted as the pistons 16 pass the trailing edge of backpressure flaps 22. The explosion of expanding gases places pressure against pistons 16, and is contained and reacted by backpressure flaps 22, thereby causing piston 14 to rotate.

Figure 14:
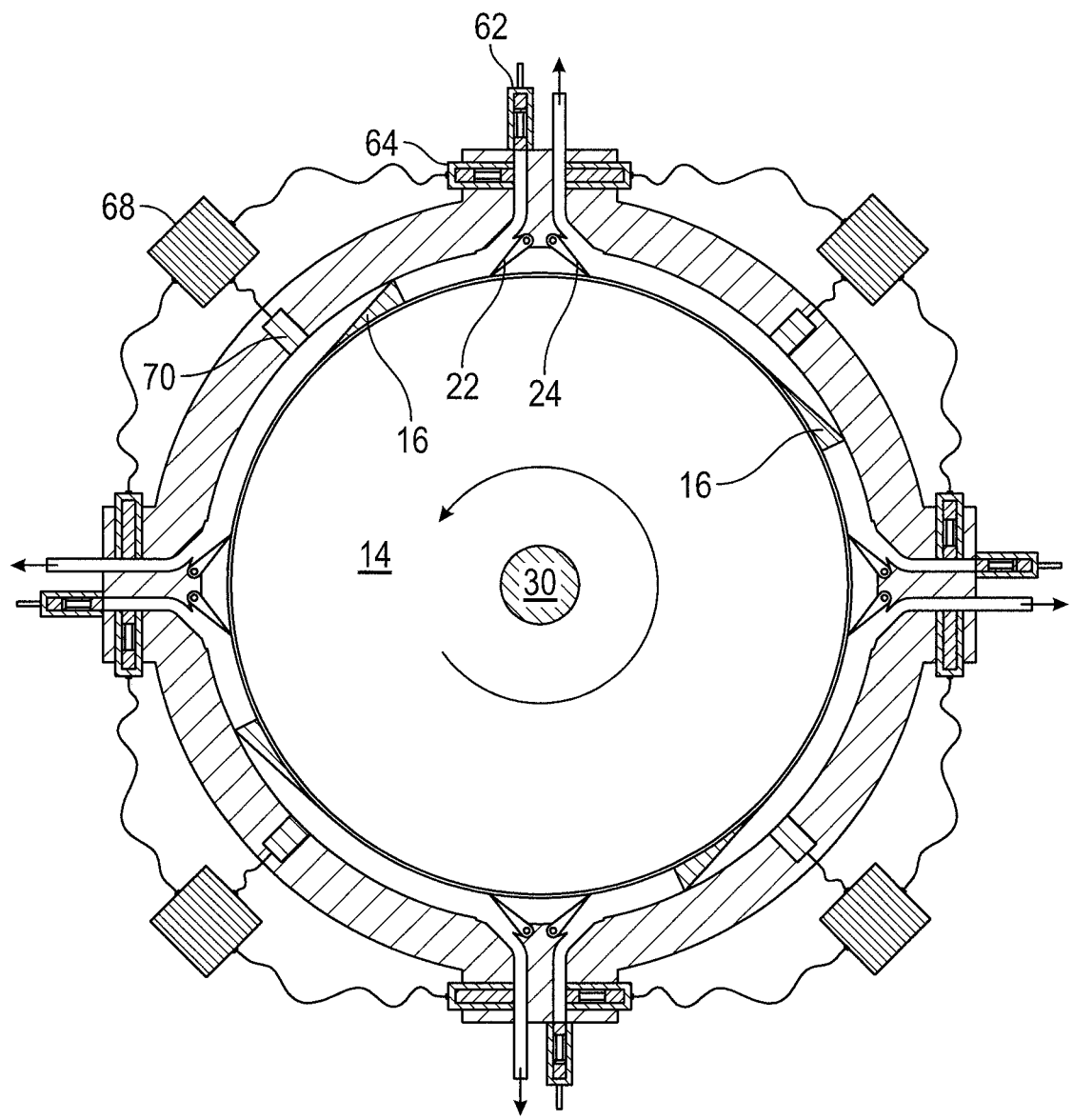
FIG. 14 is a section view of one embodiment of a rotary engine of the present disclosure configured for internal combustion mode.

FIG. 14 shows one embodiment of an internal combustion embodiment of the present rotary engine. Shown are fuels injectors 62, combustion igniters 64, process computers 68, piston position sensors 70, and various components of the present rotary engine as described with respect to other embodiments and modes of the device, above. Optionally, sensors may be provided for variables such as temperature, pressure, and other physical data to regarding combustion to enhance the efficiency of the combustion process.

Figure 15:
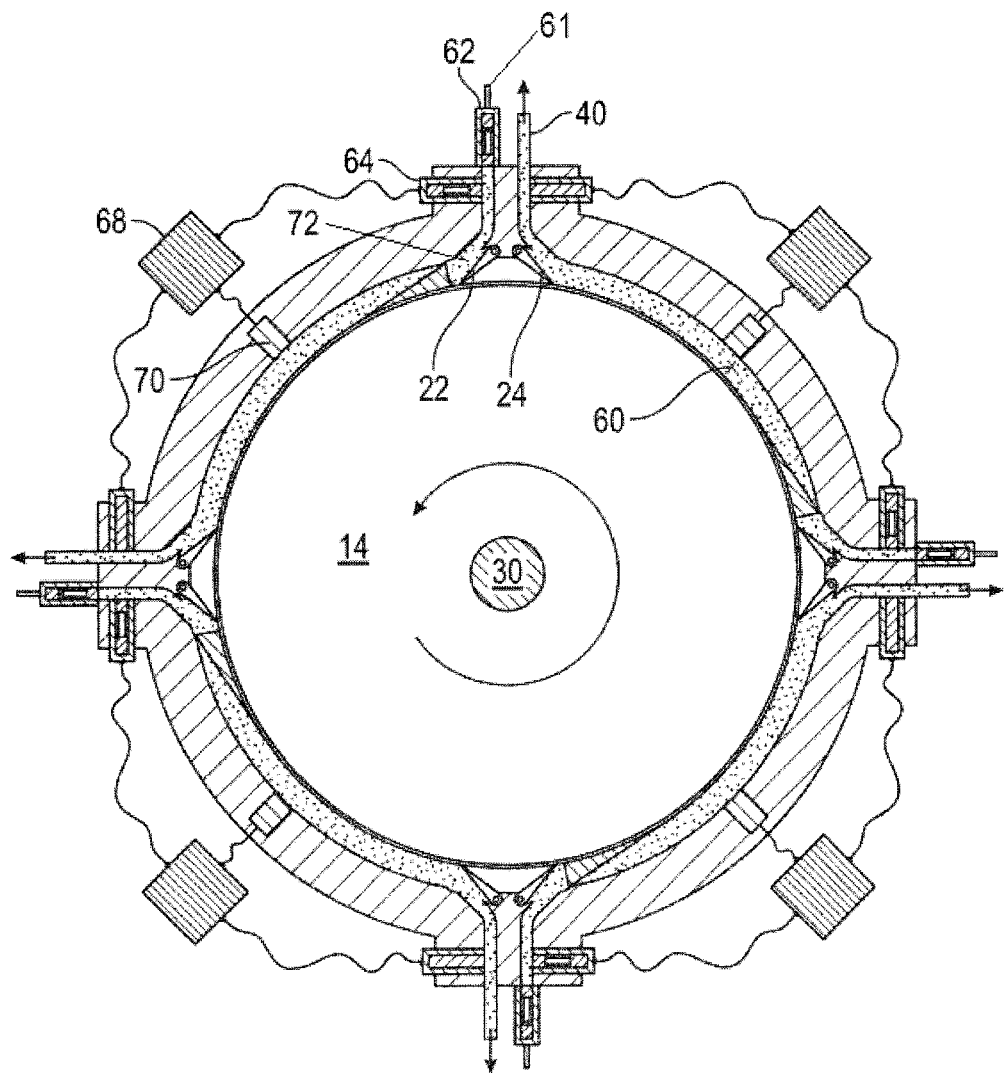
FIG. 15 is a section view of the device of FIG. 14 showing internal combustion in an early state.

FIG. 15 depicts an embodiment of the present device configured for use in an internal combustion mode, with a fuel/air mixture being introduced into a fuel injector 62 via fuel/air intake 61. The fuel/air mixture 72 being introduced into pressure chambers 60. The fuel/air mixture 72 is combusted via combustion igniters 64 (which may include, for example, spark plugs, capacitance discharge ignition components, or similar firing systems known in the art) as backpressure flaps 22 open. The backvolume of gases resulting from fuel/air mixtures that have already been combusted are free to exhaust via outlets 40 at zero gauge pressure.

Figure 16:
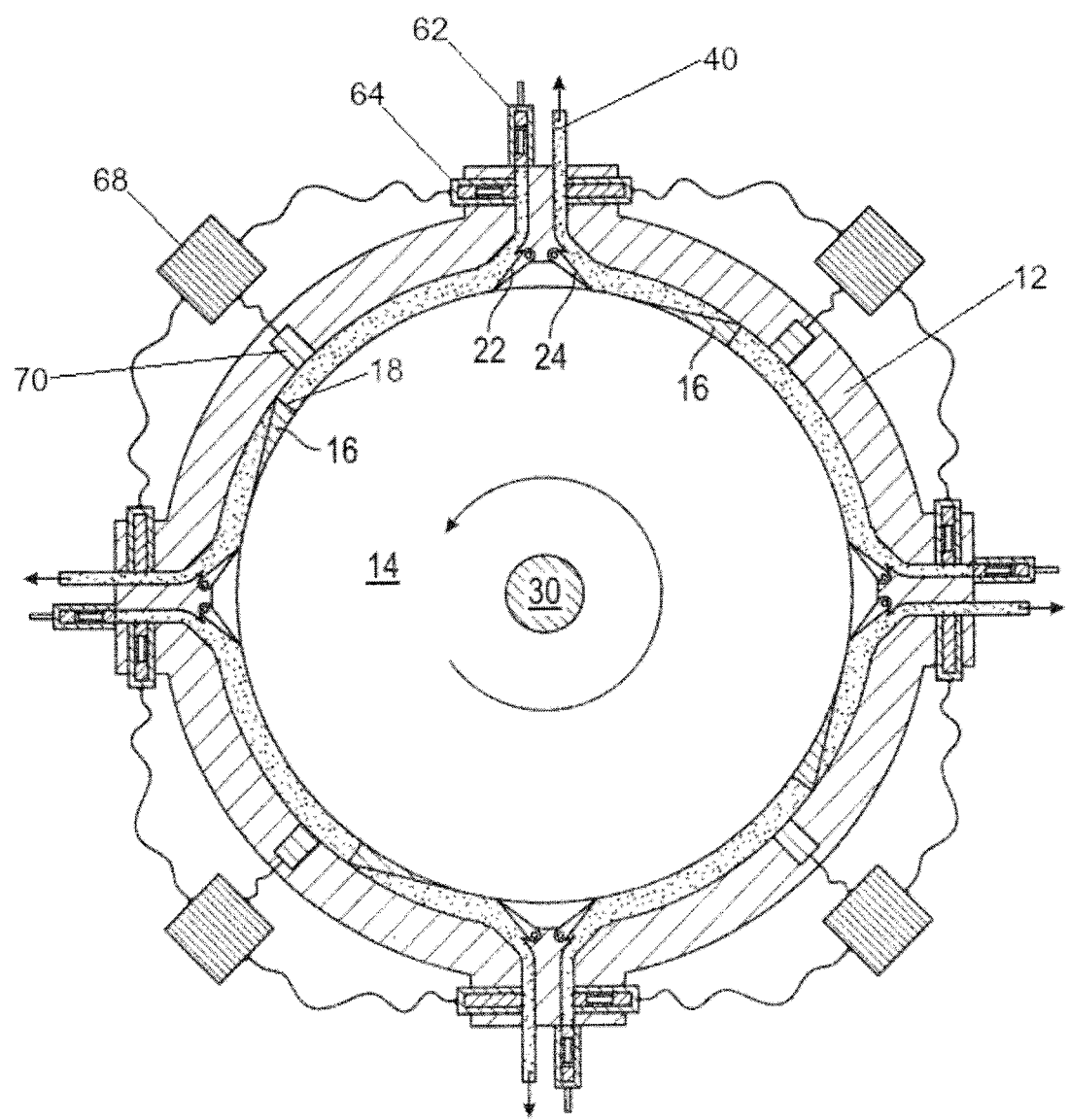
FIG. 16 is a section view of the device of FIG. 14 showing internal combustion in a more progressed state.

FIG. 16 depicts the expansion of the fuel/air mixture upon combustion. The pressure generated impacts against piston faces 18 of pistons 16, as well as backpressure flaps 22 and the fluid source. As with other embodiments of the present rotary engine, only rotor 14 is able to move, and does so via pistons 16. Air or other gases present on the back side of pistons 16 is "scooped" out to outlets 40 at zero gauge pressure. At this stage in the operation of the engine, backpressure flaps 22 and effluent flaps 24 are in the open position. It should be noted that fuel injectors 62 remain closed at all times during the operation of the engine except that the instant of fuel/air mixture injection. Because fuel injectors 62 are closed, the expanding gas pressure within pressure chambers 60 is contained.

Figure 17:
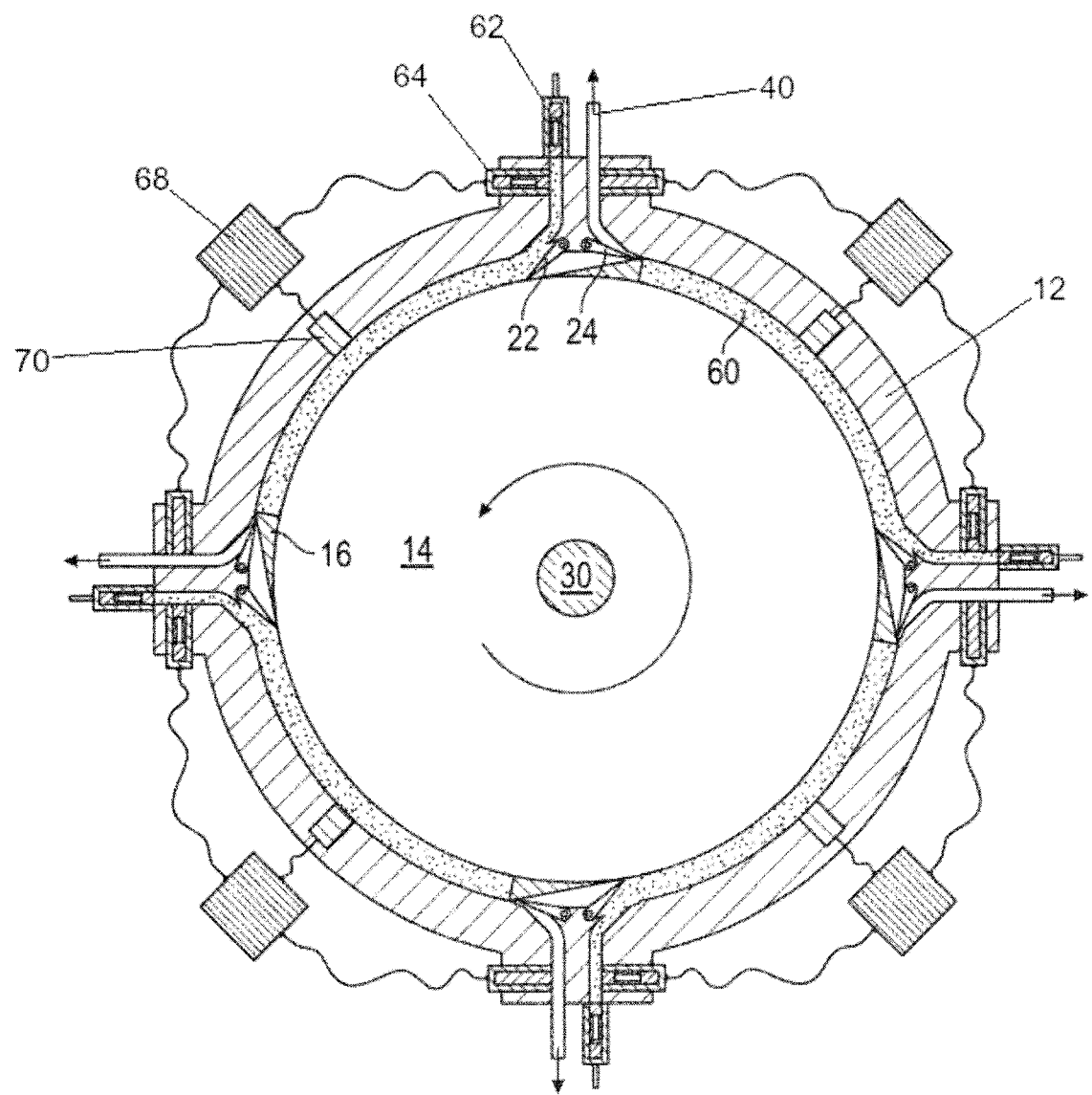
FIG. 17 is a section view of the device of FIG. 14 showing internal combustion in a more progressed state.
Figure 18:
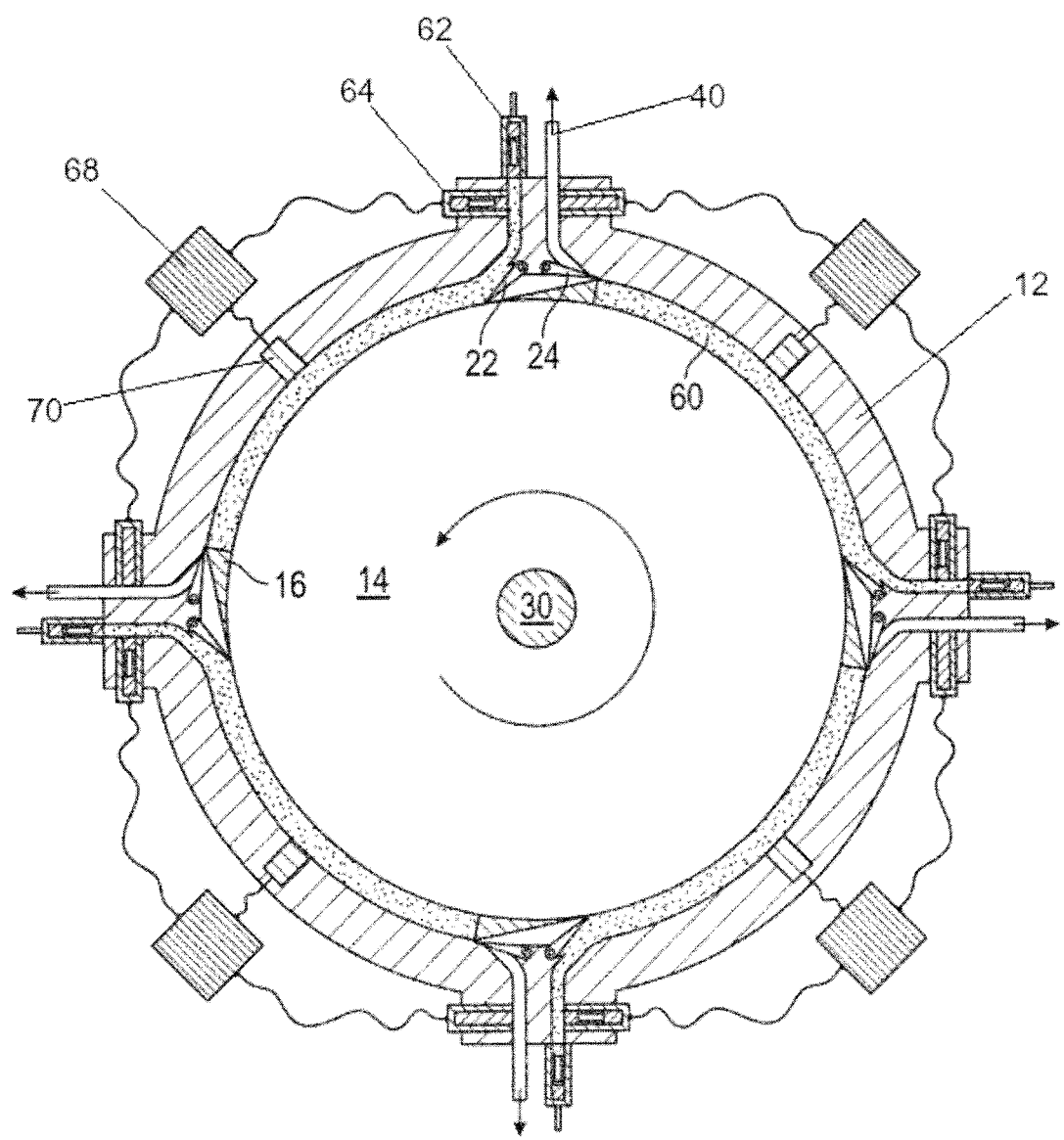
FIG. 18. is a section view of the device of FIG. 14 showing internal combustion in a more progressed state.
Figure 19:
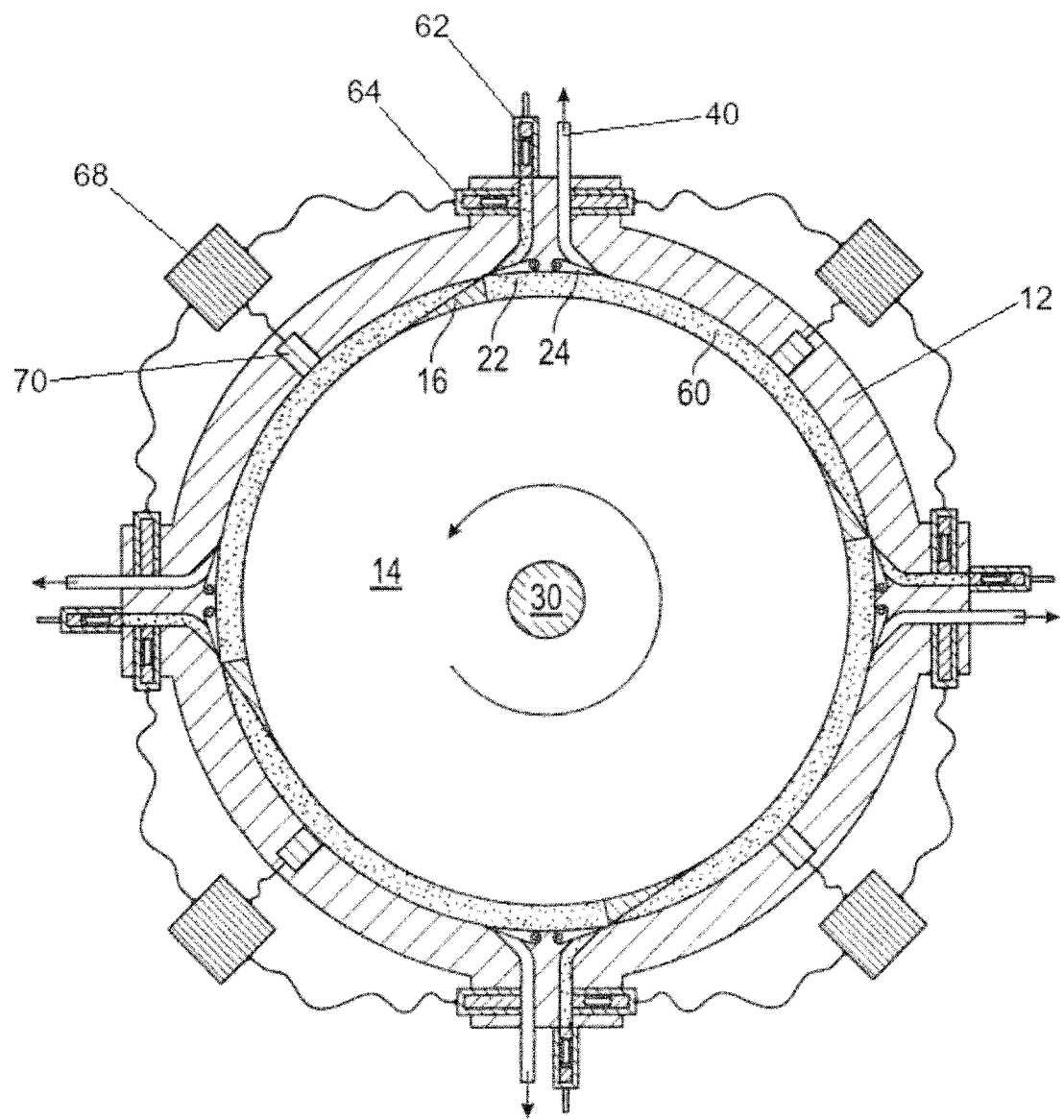
FIG. 19 is a section view of the device of FIG. 14 showing internal combustion in a more progressed state immediately prior to returning to the state of FIG. 14.

In the stage of the rotary engine shown in FIG. 17, pistons 16 have continued to move under pressure. Backpressure flaps 22 remain open, and will remain so until the faces of the pistons 16 pass a respective flap. Effluent flaps 24 have already been moved substantially toward the closed position by operation of pistons 16. In FIG. 18, the combusting gases are still expanding within pressure chambers 60. Effluent flaps 24 are fully closed, and backpressure flaps 22 are shown as positioned just prior to movement toward the closed position by action of pistons 16. In the stage shown in FIG. 19, backpressure flaps 22 and effluent flaps 24 are all in the fully closed position. Backpressure flaps 22 have been moved into the closed position by the action of pistons 16. Effluent flaps 24 are retained in closed position by any suitable mechanism. Pressure chambers 60 are filled with spent gases, which will subsequently be exhausted as a new fuel/air mixture is injected into the system and ignited with the opening of backpressure flaps 22. The engine effectively returns to the state depicted in FIG. 15.

It should be noted that the large torque arm relative to the area of pistons 16, as well the placement of multiple pistons 16 along the outer face of rotor 14, allows for the production of substantial power relative to the initial pressure within the pressure chambers. For example, it is contemplated that a 2" thick rotor with six 2" square pistons and a torque arm of one foot, spinning at 100 RPM, would generate an output of 41.1 horsepower. This assumes friction losses of about 10%.

Friction losses for a given embodiment of rotary engine 10 can be determined through mathematic analysis and modeling. Rotor 14 must be sealed along the entire perimeter of both sides of the rotor, against the walls of housing 12 and, in embodiments of rotary engine 10 having a stator middle plate 36, against the middle plate as well. Unlike the seal of the piston face seals, the length of the rotor side seals presented an engineering challenge because of the potential for significant losses due to friction. It is desired that the coefficient of friction between any two mating, moving surfaces be as low as possible. These values present constants that can be taken into consideration when determining overall friction loss in the system. Friction losses across seals are a function of the length of the seal line and the force placed on the mating surface by the seal. The force placed on the mating surface by the seal may be a function of spring force, in embodiments wherein the seals are spring-loaded, or the internal pressure within rotary engine 10, in embodiments wherein that pressure is relied upon to press the seal against the mating surface. For embodiments in which the seals are spring-loaded and perpendicular to the force of the internal pressure on the mating surface, friction losses are strictly a function of the coefficient of friction and the spring force on the seal line. For embodiments in which the seals are not spring-loaded, the friction losses are a function of both the coefficient of friction and the internal pressure force on the seal line (which is, in turn, a function of the effective area of the internal pressure pushing the seal against the mating surface).

Example 4—Friction Loss

Friction losses for a hypothetical embodiment of rotary engine 10 have been determined mathematically. For purposes of this example, rotary engine 10 is assumed to incorporate flat metal seals that bridge two surfaces turning relative to one another, and the internal pressure of rotary engine 10 is used to press the seal against the mating surface. The force of that pressure, multiplied by the appropriate coefficient of friction, provides an estimate of the reverse forces on rotor 14.

The hypothetical rotary engine 10 contemplated in this example has a ring seal torque arm length (RSTAL) of 11.875" and a piston face torque arm length of 12.500". The total ring seal length is a constant within this rotary engine 10 and is equal to $(2)(\pi)$RSTAL, or $(2)(3.14159(11.875)$, which equals 74.613". Because a rotor side seal 42 exists on both sides of rotor 14, this number must be doubled, providing a total ring seal length per rotor 14 of 149.226".

Seals having a width of 0.05" and a coefficient of friction of 0.1 are available commercially. It is assumed, for purposes of this example, that the resistance in piston face seals 26 will be the same. Thus, the total tortional resistance of all seals in rotary engine 10 can be calculated. This allows calculation of the percentage of total energy input into rotary engine 10 that will be lost as a result of friction.

This example assumes an average internal pressure of 100 psi. For a rotary engine 10 having an average internal pressure of 100 psi, a seal area per inch of seal length of 0.05 square inches, and a coefficient of friction of 0.1, the force per inch of seal length is $(0.1)(0.05)(1)(100)$, or 0.5 lb/in. This would represent the friction loss per inch of seal, except it should be noted that the seal is only pressurized between piston face 18 and backpressure flap 22, which at 100 psi is at half-stroke (and therefore at half the seal length). The ring seal resistance torque (RSRT) is constant at any given stroke position, and for purposes of this example the 100 psi point halfway between the inlet (202 psi) and the outlet (2 psi) is examined. This gives the resistance of half of the ring seal, which is $(0.5)(0.5)(149.226)(11.875)(12)$, or 36.918 lb/ft. It should be noted that RSRT will vary with the width of the piston.

Turning to piston face seals 26, the sides of piston seals 18 will place 1 lb of resistance at a 12.5" torque arm and the top of piston seal 18 will place (0.5 lb/in)(piston width (PW) (in.)) at a 13.0" torque arm. Because there are four pistons on the exemplary rotary engine 10 contemplated in this example, the piston seal resistance torque (PSRT) is equal to $(4)(1.0 \text{ lb})(12.5/12)'+(0.5 \text{ lb/in})(PW")(13.0/12)')=(4)(1.042 \text{ lb/ft}+0.542PW \text{ lb/ft})$. Thus, PSRT is equal to $(4.168+0.542(PW) \text{ lb/ft})$. For a PW of 1", PSRT=$(4.168 \text{ lb/ft}+0.542(1) \text{ lb/ft})$, or 4.710 lb/ft. It can be seen, then, that as between PSRT and RSRT, RSRT is significantly more important in terms of friction losses. In this example, piston face seal 26 accounts for only 13% of the ring seal friction in rotary engine 10. As the piston face area-to-engine nominal diameter ratio increases, the PSRT contribution to total friction will rise as a percentage, but the overall piston applied torque will increase more rapidly.

The flap sides against the outer face of the rotor and over the top of the pistons also contribute to the total friction losses of the system. It is contemplated that a travel limiter will be utilized in conjunction with backpressure flaps 22 and effluent flaps 24 to limit the force applied by the flaps to the outside face of rotor 14. For purposes of this example, it is assumed that the friction force at the edge of the flaps is equivalent to the friction force of the other seals.

The flap seal length is equal to the piston width, which is equal to o.5 lb/in of piston width. The flap seal torque arm will be taken as a constant equal to the outer diameter of the rotor, which for purposes of this example is one foot. Because there are four pistons 16 there are four backpressure flaps in this exemplary rotary engine 10. There are also four effluent flaps, but since the effluent is at zero gauge pressure there is no pressure across these flaps and negligible force on them. Thus, negligible friction resistance is offered by the effluent flaps against the rotation of the piston. The flap seal resistance torque (FSRT) is equal to (4)(0.5 lb/in)(PW)"(1'), or 2PW lb/ft. The total applied piston torque (TAPT) is the total torque applied by pressure on the face of pistons 16. In the exemplary rotary engine 10, it is equivalent to four times the total piston area (TPA) times the torque arm length, which is four times the piston width, tie the constant piston height of 1", times 12.500". TAPT=(4)(100 psi)(1")(PW") (12.5")(1'/12"), or 416.667PW lb/ft. Table 1 provides piston torques and seal losses, both in absolute terms and as a percentage of piston torque (input) and total outputs (taking into account the friction losses). Values are provided for various piston widths and a constant piston height of 1".

TABLE 1

| PW (in) | TPA (sq. in) | TAPT (lb-ft) | PSRT (lb-ft) | RSRT (lb-ft) | FSRT (lb-ft) | TOT (lb-ft) | SFLP (%) |
|---|---|---|---|---|---|---|---|
| 1 | 4.000 | 416.667 | 4.710 | 36.918 | 2.000 | 373.039 | 10.47 |
| 1.5 | 6.000 | 625.000 | 4.981 | 36.918 | 3.000 | 580.101 | 7.18 |
| 2 | 8.000 | 833.334 | 5.252 | 36.918 | 4.000 | 787.164 | 5.54 |
| 2.5 | 10.000 | 1041.668 | 5.523 | 36.918 | 5.000 | 994.227 | 4.55 |
| 3 | 12.000 | 1250.001 | 5.794 | 36.918 | 6.000 | 1204.289 | 3.66 |
| 3.5 | 14.000 | 1458.335 | 6.065 | 36.918 | 7.000 | 1408.352 | 3.43 |
| 4. | 16.000 | 1666.668 | 6.336 | 36.918 | 8.000 | 1615.414 | 3.08 |

Total output torque (TOT) is the total applied piston torque, minus the piston seal resistance torque, minus the ring seal resistance torque. Thus, TOT=TAPT−PSRT−RSRT−FSRT. Seal losses as a percentage of applied torque can be calculated as seal friction loss percentage (SFLP), which is (TAPT−TOT)(100%)(TAPT).

As can be seen from the above example, friction is not expected to be a significant design issue with respect to rotary engine 10. Widening pistons 16 allow for low percentage friction losses. It is contemplated that reducing seals losses to from about 3% to about 5% would yield a final rotary engine design having total friction losses of less then about 10%.

Having thus described the preferred embodiment of the present disclosure, what is claimed as new and desired to be protected by Letters Patent includes the following:

1. A rotary engine comprising:
  a rotor including a rim;
  a piston disposed on the rim of said rotor;
  a housing sealingly engaging said rotor and said piston,
    wherein said housing defines a pressure chamber between said rotor, said piston, and an interior wall of said housing, and
    wherein said housing defines an inlet configured to allow fluid to flow into said pressure chamber and an outlet configured to allow fluid out of said pressure chamber;
  a backpressure flap pivotably attached to the interior wall of said housing and operable to move between a first position wherein an edge of said backpressure flap sealingly engages the rim of said rotor and a second position wherein said backpressure flap closes said inlet; and
  an effluent flap pivotably attached to the interior wall of said housing and operable to move between a first position wherein an edge of said effluent flap sealingly engages the rim of said rotor and a second position wherein said effluent flap closes said outlet, and
  a piston position sensor disposed within said housing and configured to detect a position of said piston in proximity thereto,
  wherein fluid flowing into said rotor through said inlet impinges upon said piston, thereby causing rotation of said rotor.

2. A rotary engine comprising:
  a rotor coupled to a shaft such that rotation of said rotor causes a corresponding rotation of said shaft,
    wherein said rotor comprises a first side wall, a second opposing sidewall, and a rim extending between the first side wall and the second side wall;
  a piston extending from the rim of said rotor and comprising a sloping rear face and a front face;
  a housing encompassing said rotor and said piston,
    wherein a portion of the piston at a junction of said rear face and said front face is sealingly engaged with an interior surface of said housing, and
    wherein a pressure chamber is defined by a face of said piston, the interior surface of said housing, and the rim of the rotor;
  an inlet for directing a fluid through said housing and into said pressure chamber;
  a backpressure flap pivotably attached to the interior surface of said housing and configured to move between sealing engagement with the interior surface of said housing and sealing engagement with the rim of said rotor, such that said inlet is closed when the backpressure flap is in sealing engagement with the interior surface of said housing;
  an outlet for directing fluid from said pressure chamber to an exterior of said housing; and
  an effluent flap pivotably attached to the interior surface of said housing and configured to move between sealing engagement with the interior surface of said housing and sealing engagement with the rim of said rotor, such that the outlet is closed when the effluent flap is in sealing engagement with the interior surface of said housing.

3. The rotary engine according to claim 2, further comprising a piston position sensor embedded within said housing and configured to detect a position of said piston in proximity thereto.

4. The rotary engine according to claim 2, further comprising an inlet valve attached to said housing and configured to selectively open and close said inlet.

5. The rotary engine according to claim 4, further comprising a control processor in electronic communication with said inlet valve for controlling the opening and closing of said inlet valve.

6. The rotary engine according to claim 2, further comprising an injector configured to inject either steam or an air/fuel mixture into said pressure chamber.

7. The rotary engine according to claim 6,
wherein said injector is configured to inject an air/fuel mixture into said pressure chamber, and
wherein the rotary engine further comprises an igniter configured to ignite the air/fuel mixture upon injection into the pressure chamber.

8. A rotary engine comprising:
a rotor coupled to a shaft such that rotation of said rotor causes a corresponding rotation of the shaft,
wherein said rotor comprises a first side wall, a second opposing side wall, and a rim extending between the first side wall and second side wall;
a plurality of pistons extending from the rim of said rotor and being equidistant from one to another,
wherein each of the plurality of said pistons comprises a sloping rear face and a front face;
a housing encompassing said rotor and said plurality of pistons,
wherein a portion of said each of the plurality of said pistons sealingly engages an interior surface of said housing at a junction between the rear face and the front face of said each of the plurality of said pistons respectively;
a plurality of inlet/outlet pairs, each of the plurality of said inlet/outlet pairs being equidistant from one to another and comprising:
a first opening defined in said housing and extending from an exterior surface of said housing to the interior surface thereof, and a second opening defined in said housing and extending from the exterior surface of said housing to the interior surface thereof;
a plurality of backpressure flaps, each of the plurality of said backpressure flaps pivotably attached to the interior of said housing and configured to move between a first position,
wherein said each of the plurality of said backpressure flaps sealingly engages the interior surface of said housing, and a second position,
wherein said each of the plurality of said backpressure flaps sealingly engages the rim of said rotor, and
wherein when in the first position said each of the plurality of said backpressure flaps closes an adjacent inlet; and
a plurality of effluent flaps, each of the plurality of said effluent flaps pivotably attached to the interior of said housing and configured to move between a first position,
wherein said each of the plurality of said effluent flaps sealingly engages the interior surface of said housing, and a second position,
wherein said each of the plurality of said effluent flaps sealingly engages the rim of said rotor, and
wherein when in the first position said each of said plurality of effluent flaps closes an adjacent outlet.

9. The rotary engine according to claim 8, further comprising a piston position sensor disposed within said housing and configured to detect a position of said each of the plurality of said pistons in proximity thereto.

10. The rotary engine according to claim 8, further comprising a plurality of injectors, each of the plurality of said injectors configured to inject either steam or an air/fuel mixture into one of a plurality of pressure chambers defined by said housing, said rotor, said each of the plurality of said pistons, and said each of the plurality of said backpressure flaps.

11. The rotary engine according to claim 10,
wherein the plurality of said injectors is configured to inject an air/fuel mixture; and
wherein the rotary engine further comprise a plurality of igniters, each of the plurality of said igniters configured to ignite said air/fuel mixture upon said air/fuel mixture being injected into said one of the plurality of said pressure chambers.

* * * * *